United States Patent [19]

Saito et al.

[11] Patent Number: 5,589,879
[45] Date of Patent: Dec. 31, 1996

[54] PERFORMING WHITE BALANCE CORRECTION ON INTEGRATED DIVIDED AREAS OF WHICH AVERAGE COLOR IS SUBSTANTIALLY WHITE

[75] Inventors: Kenji Saito; Yasuhiro Shinkai, both of Asaka, Japan

[73] Assignee: Fuji Photo Film Co., Ltd., Kanagawa, Japan

[21] Appl. No.: 216,850

[22] Filed: Mar. 24, 1994

[30] Foreign Application Priority Data

Mar. 26, 1993 [JP] Japan .................................. 5-067715
Mar. 30, 1993 [JP] Japan .................................. 5-071290
Mar. 31, 1993 [JP] Japan .................................. 5-074257

[51] Int. Cl.$^6$ ........................................... H04N 9/73
[52] U.S. Cl. ................................. 348/223; 348/655
[58] Field of Search ........................... 348/223 OR, 655; H04N 9/73

[56] References Cited

U.S. PATENT DOCUMENTS 5,319,449  6/1994  Saito et al. .......................... 348/223
5,329,361  7/1994  Matsui et al. ........................ 348/655

FOREIGN PATENT DOCUMENTS 3148990  6/1991  Japan .............................. H04N 9/73
3148988  6/1991  Japan .............................. H04N 9/73
4893  1/1992  Japan .............................. H04N 9/73

Primary Examiner—Victor R. Kostak
Assistant Examiner—Cheryl Cohen

[57] ABSTRACT

White balance control for a video camera is strongly influenced by remarkably change of brightness level, color of an object and photographing conditions. An automatic white balance control device according to the present invention for a video camera can control white balance by controlling timming of outputing control signals for controlling gains of amplifiers for control white balance and changing signal process of a picture image in accordance with a percentage of white color shared in the picture image.

14 Claims, 32 Drawing Sheets

Fig.1

Prior Art

| $a_1$ | $a_2$ | $a_3$ | $a_4$ | $a_5$ |
|---|---|---|---|---|
| $a_6$ | $a_7$ | $a_8$ | $a_9$ | $a_{10}$ |
| $a_{11}$ | $a_{12}$ | $a_{13}$ | $a_{14}$ | $a_{15}$ |
| $a_{16}$ | $a_{17}$ | $a_{18}$ | $a_{19}$ | $a_{20}$ |

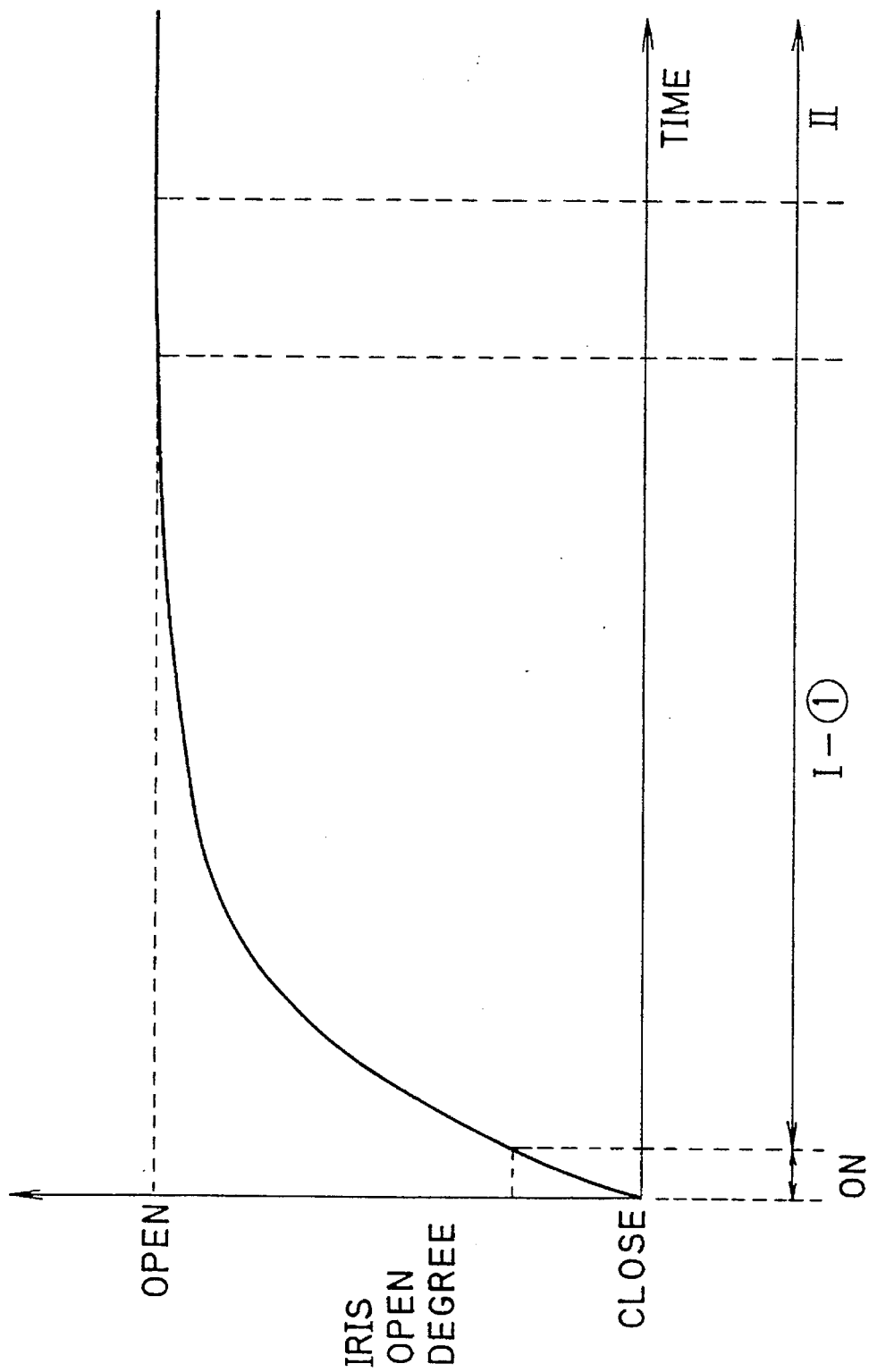

PERFORMING WHITE BALANCE CORRECTION ON INTEGRATED DIVIDED AREAS OF WHICH AVERAGE COLOR IS SUBSTANTIALLY WHITE

BACKGROUND OF THE INVENTION

The present invention relates to an automatic white balance control device and a video camera with the automatic white balance control device, particularly to an automatic white balance control device and a video camera with a white balance control device which can be controlled at high speed, change white balance control modes corresponding to photograph conditions and operate white balance control stably at a moment when actual recording is started.

In a production operation of an automatic white balance control device for a video camera, in the case that a color temperature is detected from an output signal of an image pick-up elements of a charge coupled device (CCD) and so on, a control signal is detected from a color temperature detecting signal and then gains of amplifiers for controlling white balance control is controlled by feed forward control, control error of white balance caused by dispersion of image pick-up elements, gap of color temperatures between a reference illuminating light memorized in a production operation and natural sunshine or actual illuminating light of various fluorescent lamps can be reduced.

In an automatic white control device according to the present invention, while an iris is moved to open at high speed, a certain value of a white balance control signal can be detected.

Prior Art

In a conventional video camera, white balance is controlled in order to obtain a white reproduced picture image when a white object is photographed. In a white balance control operation, gains of a red singal and a blue signal of the video camera are controlled with reference to a green signal.

In an automatic white balance control circuit in a type of integrating picture image, white balance is controlled in a condition that integrated color signal elements of whole pick-up image would become achromatic color.

In the automatic white balance control circuit in the type of integrating picture image, color signal elements are integrated. There are two types depending on integrating processes. One type is to integrate color signals of a whole picture image totally and another type is to integrate color signals of each divided areas of a picture image.

The type of separately integrating color signals of each area of a picture image will be described with reference to FIG. 1. As shown in FIG. 1, a picture image is divided to a plurality of areas (sections). Usually, each areas are numbered from al to a20 in order, for instance. In actuality, there are a large number of divided areas. However, to explain the operation of the invention simply, the number of the divided areas is set to be twenty in FIG. 1. During the first vertical scanning period (herein after it is referred as "V term"), a signal element of an area al is integrated and an integrated value i1 is obtained. During the second V term, a signal element of an area a2 is integrated and an integrating value i2 is obtained. Likewise, each areas, areas a3, a4, a5, . . . are successively scanned for every V term in order. Finally, an integrated value i20 of an area a20 can be obtained in the 20th V term. Among the integrated values i1 through i20, the integrated values which indicates white data are selected. A color temperature of an object is detected based on selected data (integrated values) Thus, white balance is controlled. In the above process, areas of which integrated values mean white data are only selected among the whole of areas. The type of separately integrating color signals is superior to the type of totally integrating color signals in view of accuracy.

In an integrated circuit (IC) utilized in a conventional commercially produced video camera, integrating calculation is operated only one time for each V term. In automatic white balance control in the type of separately integrating color signals, it has to wait for a period (V term x number of divided areas) to control white balance once time. Therefore, if color temperature would be changed rapidly, white balance control can not respond to such a change. On the other hand, in the type of totally integrating color signals, a data calculation for white balance control can be operated within one V term.

In a conventional automatic white balance control device for a video camera, there are two kinds depending on control operations. One is a feed back control type and another is a feed forward type.

In an automatic white balance control device of the feed back control type, gains of white balance control amplifiers are controlled to equalize a color temperature detected signal output from an image pick-up element such as a charge coupled device (CCD) and a reference signal. If a controllable range is wide, dispersion of image pick-up elements, i.e. CCD, is adversely influenced to a control result.

In an automatic white balance control device of the feed forward control type, color elements output from an image pick-up element such as a charge coupled device (CCD) are divided into each element color signals and detected values for each elementary color signal R, G, B are integrated for every one field. Further, ratios R/B and B/G are calculated and control values Rcont and Bcont are determined by the detected ratios R/B and B/G, respectively. Thus, gains of white balance control amplifiers can be controlled. Usually, illuminating light having color temperature 3200K is utilized as a reference illuminating light. A desired reference illuminating light having an optional color temperature can be obtained by using a color temperature convert filter with the reference illuminating light in order to approximate light of sunshine, an indoor fluorescent lamp and an incandescent lamp, so that a color temperature detecting region for judging an actual light source and a color temperature control region for selecting proper control values Rcont and Bcont corresponding to the actual light source (described after) can be determined.

However, in the feed forward control operation, characteristic of image pick-up elements such as a charge coupled device, for example, dispersion of integral color filters, is influenced to a dispersion of detected values. Such a dispersion of detected values is negatively influences white balance control. The desired illuminating light does not always match real sunshine and real indoor fluorescent illumination light. Therefore, when an object is photographed under sunshine or a fluorescent lamp, a color temperature detecting region and a color temperature control region become wrong in some cases.

To resolve the above problem, in a conventional method, a color signal photographed at an optional temperature is divided by a color signal photographed under a reference illuminating light as a reference value. However, in the conventional method, dispersion caused by image pick-up elements can not be sufficiently reduced.

As a compact and portable video camera integrated with a video tape recorder (herein after it is referred as "video camera"), a video camera as shown in FIG. 2 has been developed. As shown in FIG. 2, an outer packaging case 02 of the video camera 01 has a flat thin wall along a direction from the front to the rear of a camera body (arrows A, B in FIG. 2) and a generally rectangular parallelpiped shape. A photographing lens 03 and an optical view finder 04 are mounted at an upper portion of the outer packaging case 02. A stereo microphone 05 is mounted on a top portion of the outer packaging case 02. Numerals 06, 07, and 08 09 indicate a video tape recorder deck, a side grip portion, a photograph button and a telescope/wide switch button, respectively.

In the video camera 01 as shown in FIG. 2, an optical view finder 04 is utilized instead of an electronic view finder, so that an operator can find an object or a sight through the optical view finder 04 even if electric power is turned off. For such a video camera 01, a power save mode can be designed to an integrated circuit.

In the video camera 01 with a power save mode program, even if a power switch is shifted to ON and the photograph button 08 is not actuated, electric power is supplied to a part of mechanical portion and a microcomputer. However, electric power is not supplied to a computing mechanism part of the microcomputor and a circuit of a photographing mechanism part so that electric energy can be saved. During such a power save mode, a rotational drum can be rotated and a mechanism part of the microcomputer for detecting sensor signals and ON/OFF conditions of the photograph button 08 is operable. However, electric power is not supplied to a charge coupled device (CCD), an integrated circuit for processing image signals and the computing mechanism part of the microcomputer and the iris is closed. In the power save mode, a sight or an object can be seen through the optical view finder 04 by an operator.

While a power switch is shifted to ON and the photograph button 08 is being pushed, the power save mode is released electric power is supplied to a all mechanical electric mechanism parts and a picture image is output from the charge coupled device. If the photograph button 08 is being pushed continously after the power save mode is released, the iris is moved to open at high speed until an exposure value becomes a proper level. Then, recording is actually started at a moment (for example, 0.50 second) after pushing the photograph button 08. A reason why the start timing of actual recording is delayed from the moment of pushing the photograph button 08 is due to a delay of a mechanical action.

If recording is actually started, it is preferable to have a stable exposure value from an initial stage. Therefore, in a period I from pushing the photograph button 08 until actually recording (see FIG. 3), white balance control is calculated by picking up a picture image signal, values of white balance control singals are detected, the detected value are converged to some proper values (just computing without actual white balance control operation), and then computed white balance control signals are output at an initial stage of actual recording in order to control white balance. After the period I, that is, the open degree of the iris becomes stable, recording is started in the period II. However, regarding the period I for computing the values of the white balance control signals, it has to be remembered that the period I is very short and an open degree of the iris is remarkably changed, that is, a brightness level is rapidly changed.

Generally, in the case of controlling white balance control, color difference signals R-Y and B-Y are utilized for detecting signals. If the color difference signals R-Y and B-Y are used as the detecting signals, as shown in FIG. 4, brightness (brightness level) becomes an important factor. If the brightness level is increased, the levels of the color difference signals are increased. In FIG. 4, white small blocks indicate a color difference signal B-Y and black small blocks indicate a color difference signal R-Y. Therefore, even if the same object is photographed, values of the white balance control signals are different due to increasing color saturation simultaneously with increasing brightness level. Within the time period I (see FIG. 3), an open degree of an iris is changed and brightness level is rapidly increased. In addition, an iris meter is actuated at high speed, hunting is apt to occur and brightness level is unstable in this condition. Even if white balance control is computed based on the color signals R-Y and B-Y as detecting signals, the white balance control can not be operated accurately.

In a conventional white balance control, a period of the white balance control is long for some reasons why a color temperature would not be changed so much for photographing at the same place and it is not suitable to change the brightness level of a recorded picture image rapidly. For example, the white balance is controlled once for every 20 through 30 fields. However, the above described period I is very short so that a conventional slow computing method can not be utilized sufficiently.

SUMMARY OF THE INVENTION

A main purpose of the present invention is to provide an automatic white balance control device and a video camera with an automatic white balance control device and a manufacturing method therefor to resolve the above described problem.

Particularly, an automatic white balance device according to the present invention of which a control period is shortened and a follow-up characteristic is improved in a type of separately integrating.

The different automatic white balance control device according to the present invention is capable of automatically switching a mode for separately integrating with high accuracy and a mode for totally integrating with high processing speed corresponding to photographing conditions.

Further, the different video camera according to the present invention with a power save mode operation is capable of accurately controlling automatic white balance from a moment when actual recording is started.

Further, another purpose of the present invention is to provide an automatic white balance control device for accurately computing white balance control at high processing speed even if a brightness level is rapidly changed.

A first feature of the present invention is to divide a picture image into two groups and control white balance at a moment when signal process is finished in each group.

A second feature of the present invention is to switch a mode for separately integrating a pick-up picture image at high accuracy and a mode for totally integrating a pick-up picture image at high process speed corresponding to a color temperature of an object.

A third feature of the present invention is to control white balance at high speed during a predetermined period starting from pushing a recording button and control white balance at low speed after passing over a predetermined period.

A fourth feature of the present invention is to design a plurality of reference illuminating lights having different color temperatures. Signals are calculated based these reference illuminating lights. A gap between the maximum calculated value and the minimum calculated value is recognized as a reference amount (for example, 100%). A gap between a detected value and a control value of a color signal having an optional color temperature is computed as a ratio such as a percentage with respect to the reference amount and the ratios are memorized. A color temperature detecting region and a color temperature control region of an automatic white balance device of each video camera is adjusted in accordance with the above ratio. Thereby, the dispersion of the detecting parts and an error of a feed forward control approximated by the reference illuminating light can be sufficiently reduced.

A fifth feature of the present invention is to compute white balance control signals Rcont and Bcont based on integrated ratios IR/IG, IB/IG, respectively for every one field or every several fields in a predetermined period (pushing a photograph button – actual recording starting), so that certain values of the white balance control signals Rcont and Bcont are obtained although an open degree of an iris is rapidly increasing.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 shows one prior art example of areas divided of a picture image

FIG. 32 shows a relation between a time period after pushing a photograph button and an iris open degree operated in the sixth embodiment according to the present invention.

DETAILED DESCRIPTION OF THE PREFERRED EMBODIMENTS

With reference to the drawings, the embodiments of the present invention will be described.

Figure 5:
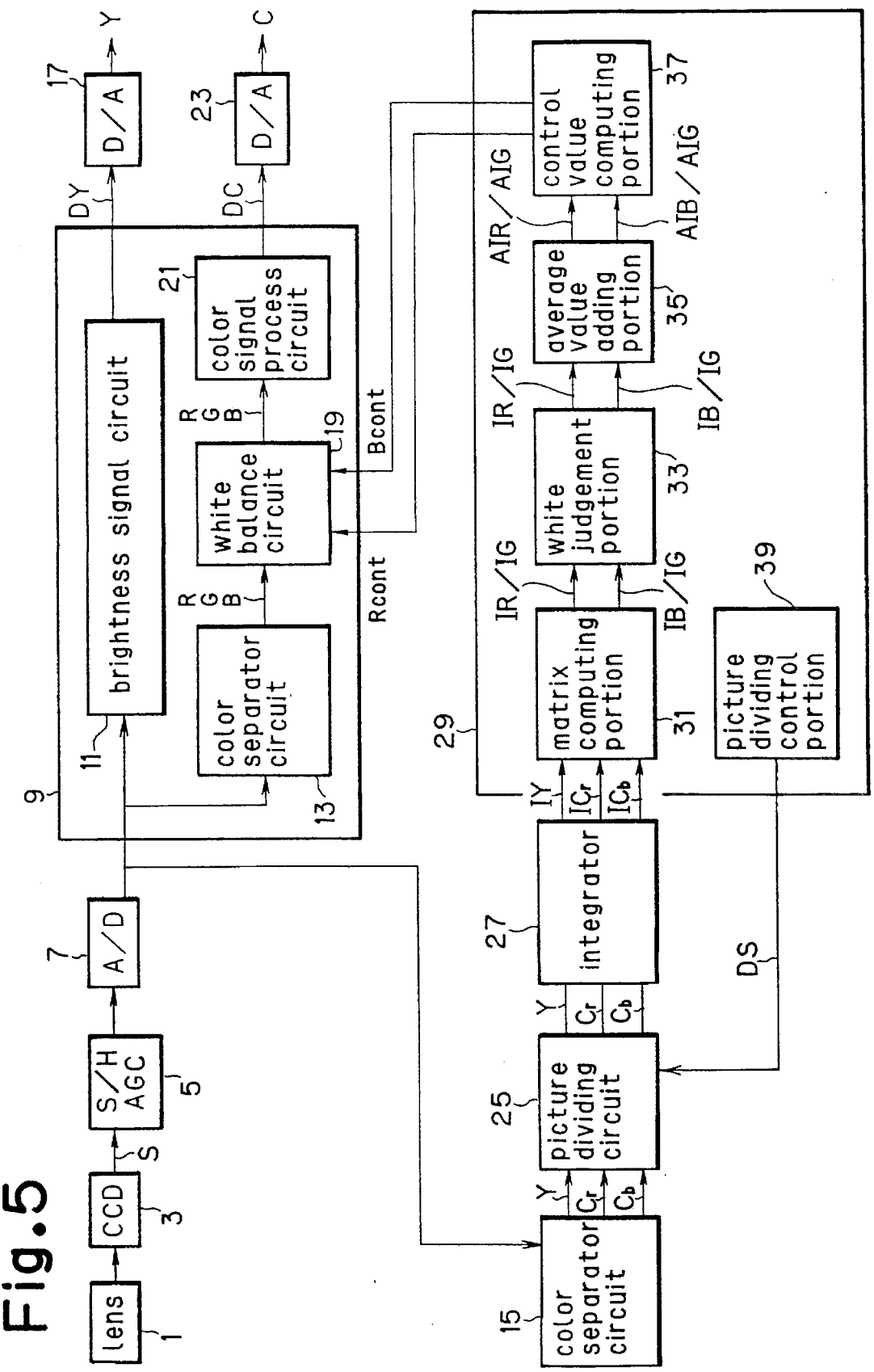
FIG. 5 shows a circuit of photographing system utilized for the first embodiment of a video camera according to the present invention.

FIG. 5 shows a circuit of a photograph system of a video camera of the first embodiment of the present invention. As shown in FIG. 5, a picture image is pick up by a lens 1 and the picture image is formed on a light receiving surface of a charge coupled device (CCD) 3. A photograph signal S is output from the charge coupled device 3. The photograph signal S is sample/hold (S/H) processed and Gain controlled in a sample/hold and automatic gain control (AGC) circuit 5. Further, the photograph signal S is converted into a digital signal by an analog/digital (A/D) convertor 7 and input to a brightness signal process circuit 11 and a color separator circuit 13 in a signal process circuit 9 and a color separator circuit 15.

In the brightness signal process circuit 11, the photograph signal S is converted to a digital brightness signal DY and the brightness signal DY is output to a digital/analog (D/A) convertor 17. In the digital/analog convertor 17, the digital brightness signal DY is converted to a brightness signal Y and the brightness signal Y is output. In the color separator circuit 13, three element signals R, G and B are pick up by processing the photograph signal S. In a white balance circuit 19, the three element signals R, G and B are white balance controlled (Gain controlled) in accordance with white balance control signals Rcont and Bcont from a control value computing portion 37. Such white balance controlled three element color signals R, G and B are signal processed by a color signal process circuit 21 and changed to a digital color signal DC. The digital color signal DC is converted to an analog color signal C in a digital/analog convertor 23.

In the color separator circuit 15, the photograph signal S is processed and a digital brightness signal Y and color combination signal Cr and Cb are output to a picture dividing circuit 25, an integrator 27 and a microcomputer 29 in order. The microcomputer 29 has a matrix computing portion 31, a white judgement portion 33, an average value adding portion 35, a control value computing portion 37 and a picture division control portion 39.

In the picture dividing circuit 25, signals Y, Cr and Cb for a whole picture are output in one V term while a total picture command is received from the picture division control portion 39. On the other hand, signals Y, Cr and Cb for each divided areas are output in every one V term while a picture division command is received. In the integrator 27, the signals Y, Cr and Cb are integrated and a brightness integrated value IY integrated by the brightness signal Y and color combination integrated values ICr, ICb integrated by the color combination signals Cr and Cb, respectively are output to the matrix computing portion 31.

In the matrix computing portion 31 of the microcomputor 29, integrated values IY, ICr and ICb are matrix processed. A green integrated value IG, a red integrated value IR and a blue integrated value IB are detected from the integrated values IY, ICr and ICb, respectively. In accordance with integrated values IG, IR, IB of three elementary color signals, ratios IR/IG and IB/IG are detected.

Figure 6:
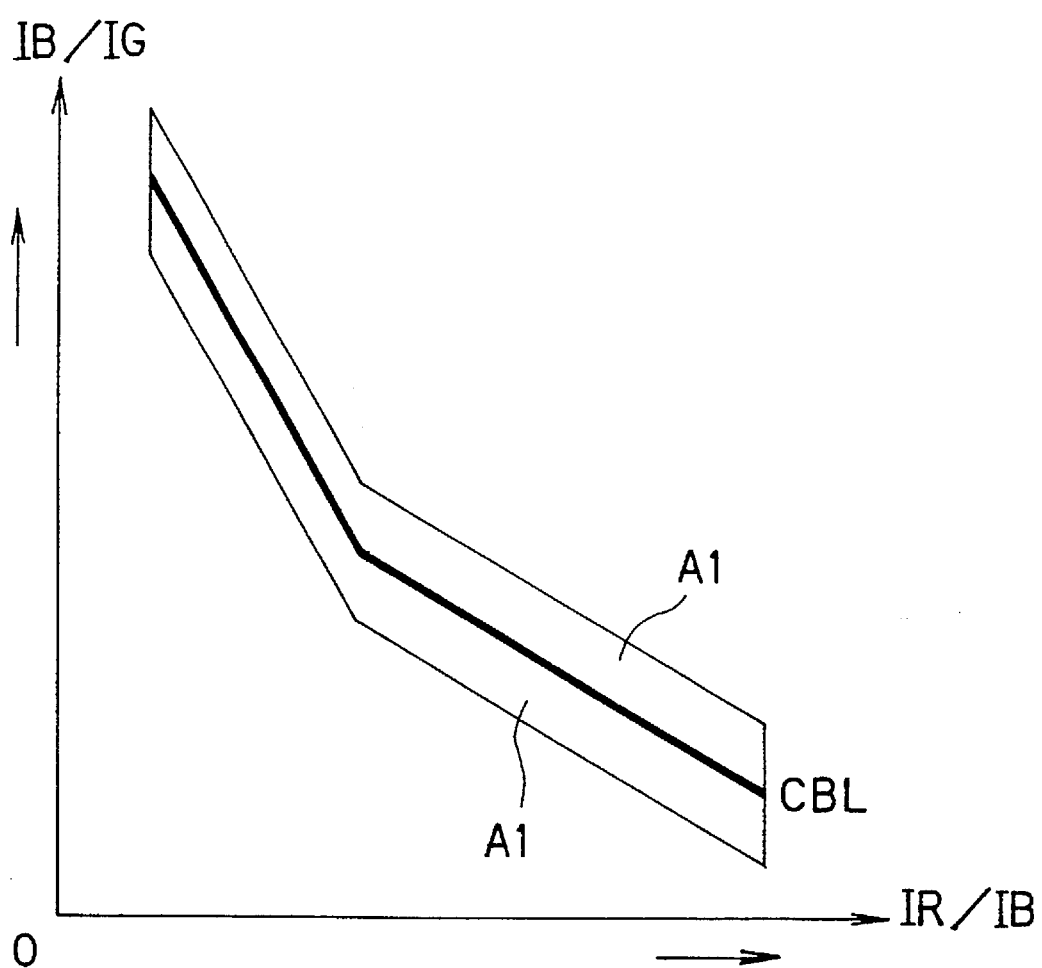
FIG. 6 shows a relation between a black body radiation approximate curvature and an automatic white balance follow-up region.

The white Judgement portion 33 decides whether divided areas from where a picture image is picked up are substantially white or not judging from the ratios IR/IG and IB/IG. As shown in FIG. 6, the white judgement portion 33 designs a black body radiation approximate curvature CBL and an automatic white balance follow-up region A1. A photograph signal S is obtained by photographing a white object under light sources having different color temperatures. The ratios IR/IG and IB/IG are detected from the values of each element color signals R, G and B of the photograph signal S so that the black body radiation approximate curvature CBL can be designed. The follow-up region A1 for controlling white balance properly is provided with some range along the black body radiation approximate curvature CBL as a center line. If the ratios IR/IG and IB/IG are located at a point within the follow-up region A1, it is judged that the picture image pick up form the divided area is substantially white. The values of the ratios IR/IG and IB/IG of which the divided areas are judged to be substantially white are only input to the average adding portion 35.

The average value adding portion 35 adds only values of the ratios IR/IG and IB/IG of which the divided areas are judged as substantially white and calculates the average values thereof. Averaged values AIR/AIG and AIB/AIG output from the average value adding portion 35 are input to the control value computing portion 37. The control value computing portion 37 outputs white balance control signals Rcont and Bcont for properly controlling white balance in accordance with the averaged values AIR/AIG and AIB/AIG. A white balance control is operated by utilizing the white balance control signals Rcont and Bcont in the white balance circuit 19.

An operation for improving a follow-up characteristic by speeding up a control cycle in case that white balance is controlled in a divided picture integrating mode is described below. As shown in FIG. 5, the picture division control portion 39 of the microcomputer 29 outputs a picture division signal DS for dividing a picture image into a plurality of areas (sections), for example, twenty areas (a1–a20) to a picture division circuit 25. A picture division circuit 25 receives a command for alternatively repeating a first pattern for picking up signals from odd number areas, a1, a3, a5, a7, a9, a11, a13, a15, a17 and a19 and a second pattern for picking up signals from even number areas, a2, a4, a6, a8, a10, a12, a14, a16, a18 and a20 for every one field (1V term).

Figure 7:
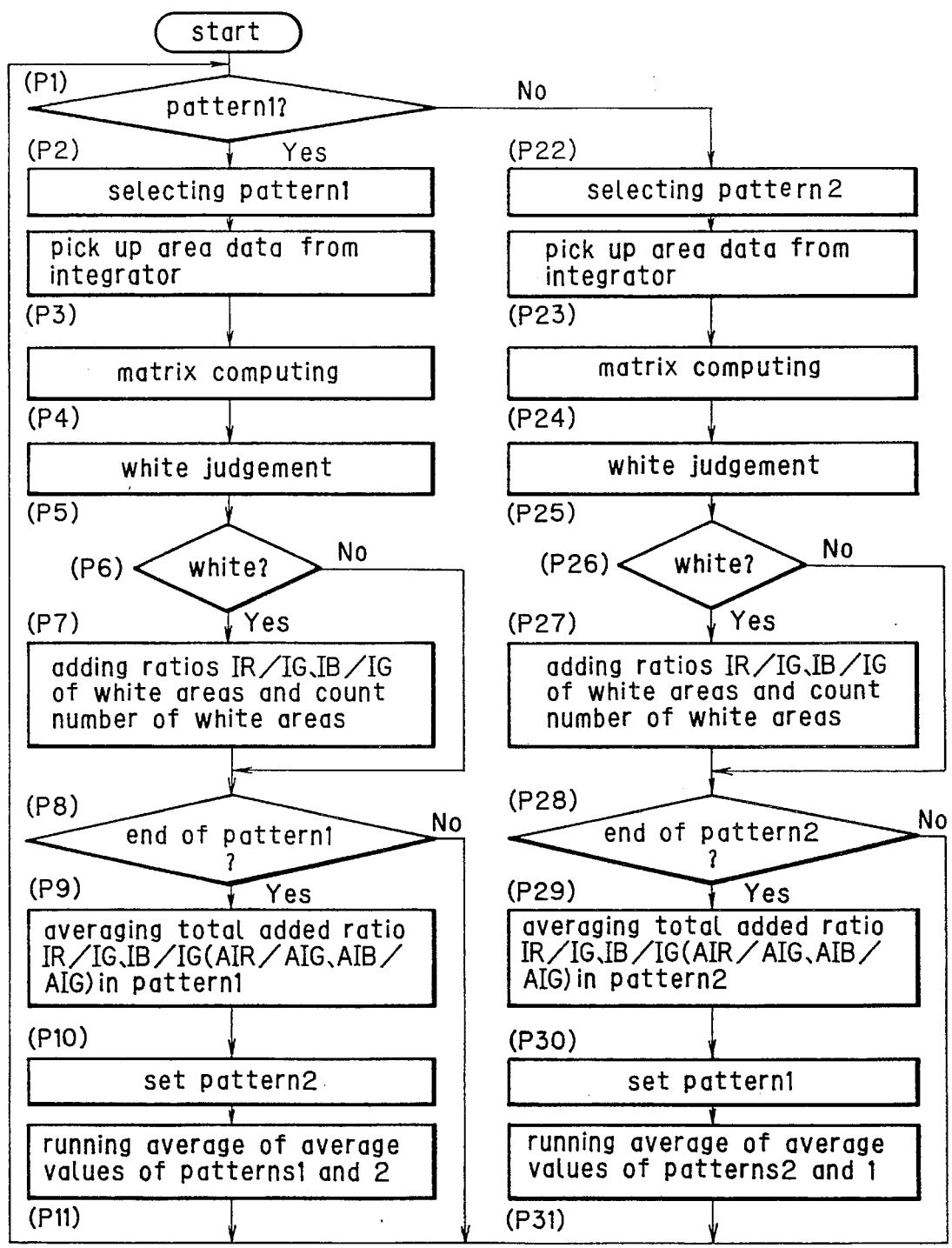
FIG. 7 is a flow chart of an operation to pick up area data with high process speed.

The above operation will be described with reference to a block diagram as shown in FIG. 1, FIG. 5 and FIG. 7.

In the first pattern (steps P1, P2 in FIG. 7), signals Y, Cr and Cb corresponding to the area a1 are output to the picture division circuit 25 and integrated in the first field. The integrated values IY, ICr and ICb are input to the microcomputor 29 through the integrator 27 (step P3). Ratios IR/IG and IB/IG are detected from the integrated values IY, ICr and ICb in the area a1 by the matrix computing portion 31 (step P4). The white Judgement portion 33 judges whether the area a1 is substantially white or not (steps P5, P6). If the white judgment portion 33 judges that the area a1 is substantially white, the values of the ratios IR/IG and IB/IG are added and averaged in the adding and averaging portion 35 (step P7), respectively. Unless the white judgement portion 33 judges that the area a1 is substantially white, the values of the ratios IR/IG and IB/IG are not added.

In the second field, the signals Y, Cr and Cb corresponding to the area a3 are processed as similar as the steps P2 through P7 in the first field. Similarly, the same processes are continuously repeated for each odd numbered areas a5, a7, a9, a11, a13, a15, a17 and a19 for every one field (steps P2 through P7). After finishing the process for the area a19 (step P8), all values of the ratios IR/IG and IB/IG of the areas which are judged as substantially white are input into the average value adding circuit 35 for calculating average values AIR/AIG and AIB/AIG (step P9). The average values are calculated by adding all values of the ratios IR/IG and IB/IG input into the average value adding portion 35 and divided the total values by number of areas which are judged as to be substantially white, respectively. That is, the average values AIR/AIG and AIB/AIG are averaged values of the added total ratios IR/IG and IB/IG of which odd number areas are judged as substantially white, respectively.

When the average values AIR/AIG and AIB/AIG are obtained, the similar operation is proceeded to the second pattern (step P10).

In the control value computing portion 37, running averages of the last average values AIR/AIG and AIB/AIG obtained in the first pattern and the adding and averaging ratios AIR/AIG and AIB/AIG obtained in the previous second pattern (the second pattern is processed by the same operation of the first pattern with respect to even number areas a2, a4, . . . a18 and a20) (step P11).

The control value computing portion 37 outputs white balance control signals Rcont and Bcont in accordance with running averages detected in the average value adding portion 35 in order to operate optimum white balance control. After finishing the first pattern, that is, signals in a half of the areas, al, a3 . . . a19 are finished being processed, white balance can be controlled. A process time becomes the half of the conventional time in which white balance is controlled after processing all twenty areas allowing the white balance to be controlled quickly in order to follow up a rapid color temperature change.

Figure 8A:
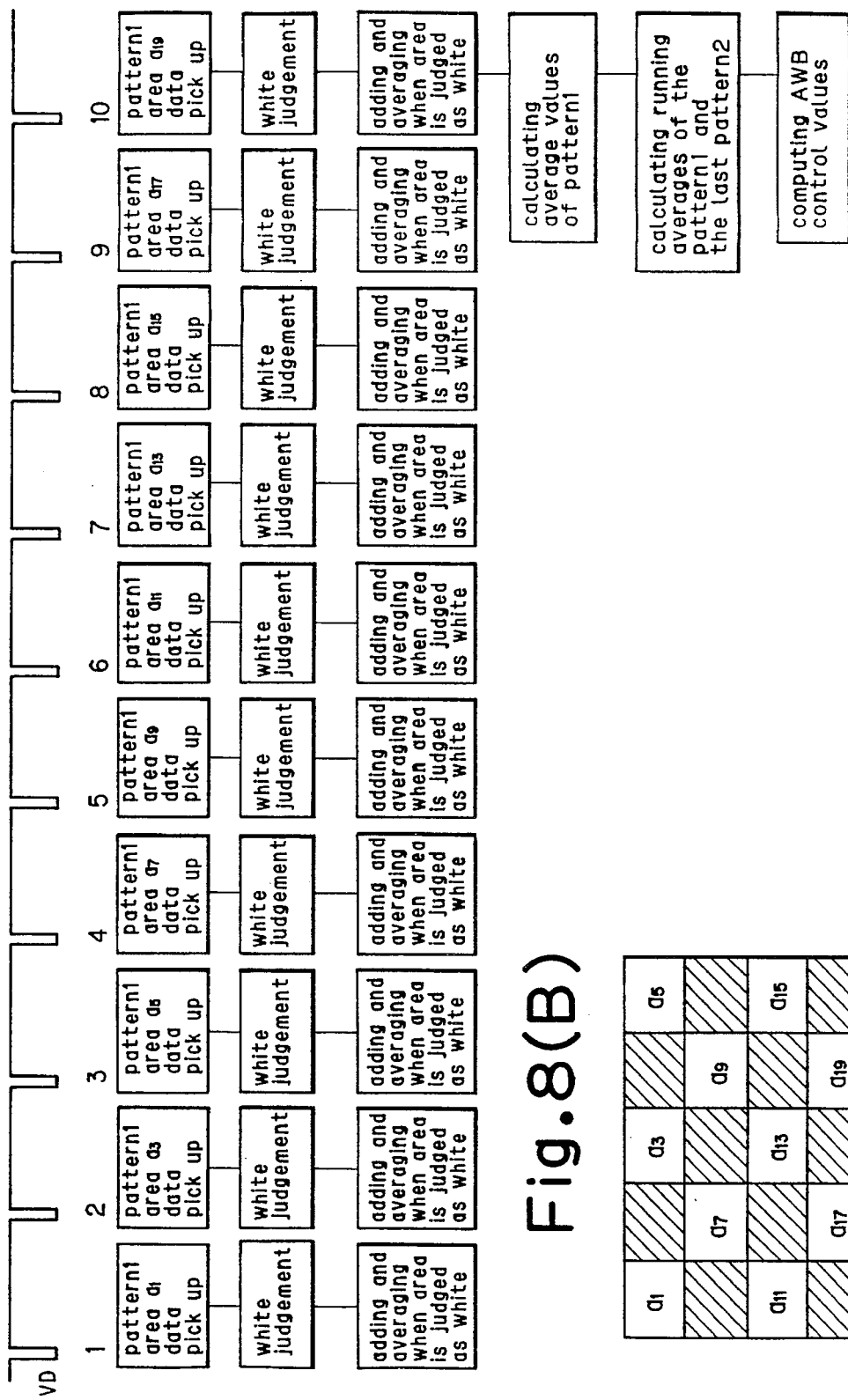
FIG. 8A shows an operation to pick up area data in the first pattern and FIG. 8B shows one of examples of selected areas in the first pattern.
Figure 8B:
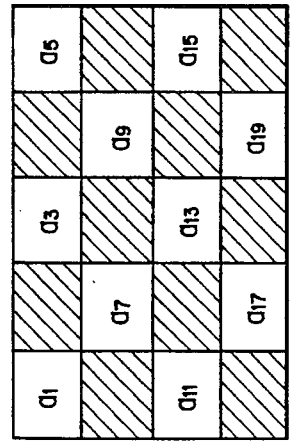

FIG. 8A shows a flow chart of an operation in which the first pattern is selected. FIG. 8B shows one of examples of selected areas in the first pattern.

If the second pattern is selected (steps P10, P1 and P22), the signals Y, Cr and Cb corresponding to the area a2 are only output from the picture division circuit 25 in the eleventh field term (the next term after the tenth field term in the first pattern). The integrated values IY, ICr and ICb integrated from the signals Y, Cr and Cb are input to the microcomputor 29. The ratios IR/IG and IB/IG are detected from the integrated values IY, ICr and ICb in the area a2 by the matrix computing portion 31 (step P24). The white judgement portion 33 judges whether the area is substantially white (steps P25 and P26). The only values of the ratios IR/IG and IB/IG of which areas are judged as to be substantially white are added to the average value adding portion 35 (step P27). The values of the ratios IR/IG and IB/IG of which area are not judged substantially white are not added.

In the twelfth field term, the signals Y, Cr and Cb corresponding to the area a4 are processed as similar as the above process (steps P22 through P27). Likewise, in every one field, signals corresponding to even number areas a6, a8, a12, a14, a16, a15, a20 are processed in order (steps P22 through 27). After processing the signals corresponding to the area a20 (step P28), average values AIR/AIG and AIB/AIG which are averaged values of the ratios IR/IG and IB/IG of which areas are judged to be substantially white in the second pattern are detected (step P29). The average values can be obtained by dividing total values of the ratios IR/IG and IB/IG in the average value adding portion 35 by number of areas judged to be substantially white. That is, the average values are averaged values of the ratios IR/IG, IB/IG of the areas judged to be substantially white among the areas a2, a4, . . . a18, a20, respectively.

If the average values AIR/AIG and AIB/AIG are determined in the second pattern, the average values AIR/AIG and AIB/AIG will be calculated again (step P30).

The control value computing portion 37 computes running averages of the average values AIR/AIG and AIB/AIG in the pattern 2 and the average values AIR/AIG and AIB/AIG in the last pattern 1 (step P31).

The control value computing portion 37 outputs whole balance control signals Rcont and Bcont based on the running average values detected in the step P31 in order to control white balance properly. At the moment that the second pattern is finished, that is, the process is finished for the half of the areas ten a2, a4, . . . a18, a20 out of the twenty areas, white balance can be controlled. Comparing with the process according to the present invention with a conventional process for processing all areas (twenty areas), the process time of the present invention can become half of the process time of the conventional process. The control process becomes quick so that the white balance can follow up rapid change of a color temperature.

Figure 9A:
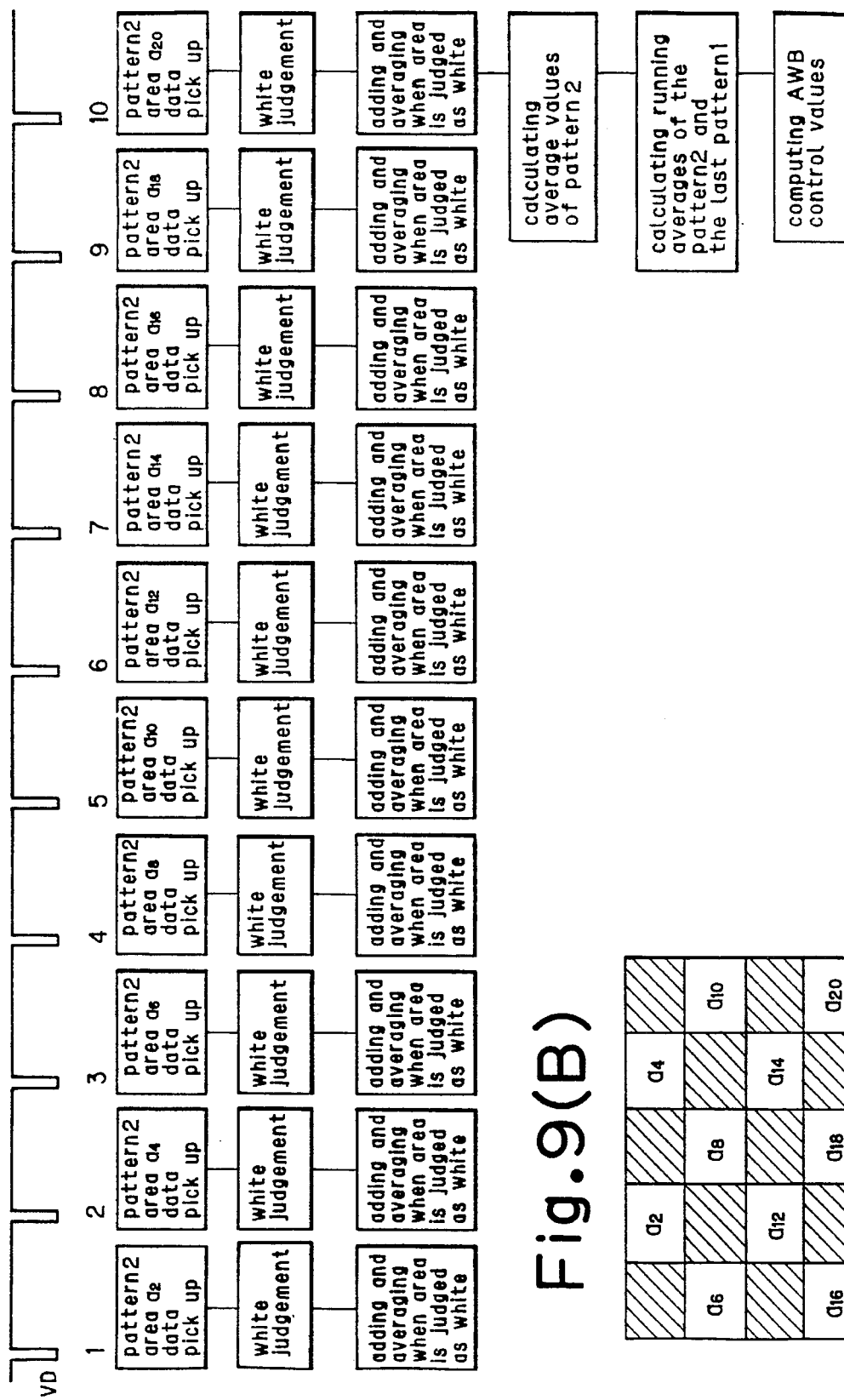
FIG. 9A shows an operation to pick up area data in the second pattern and FIG. 9B shows one of examples of selected areas in the second pattern.
Figure 9B:
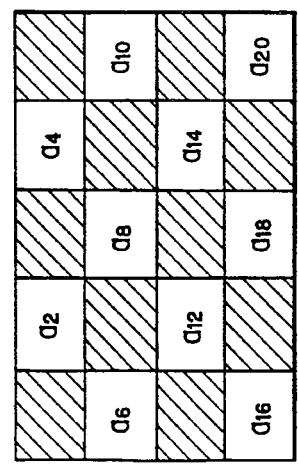
Figure 10:
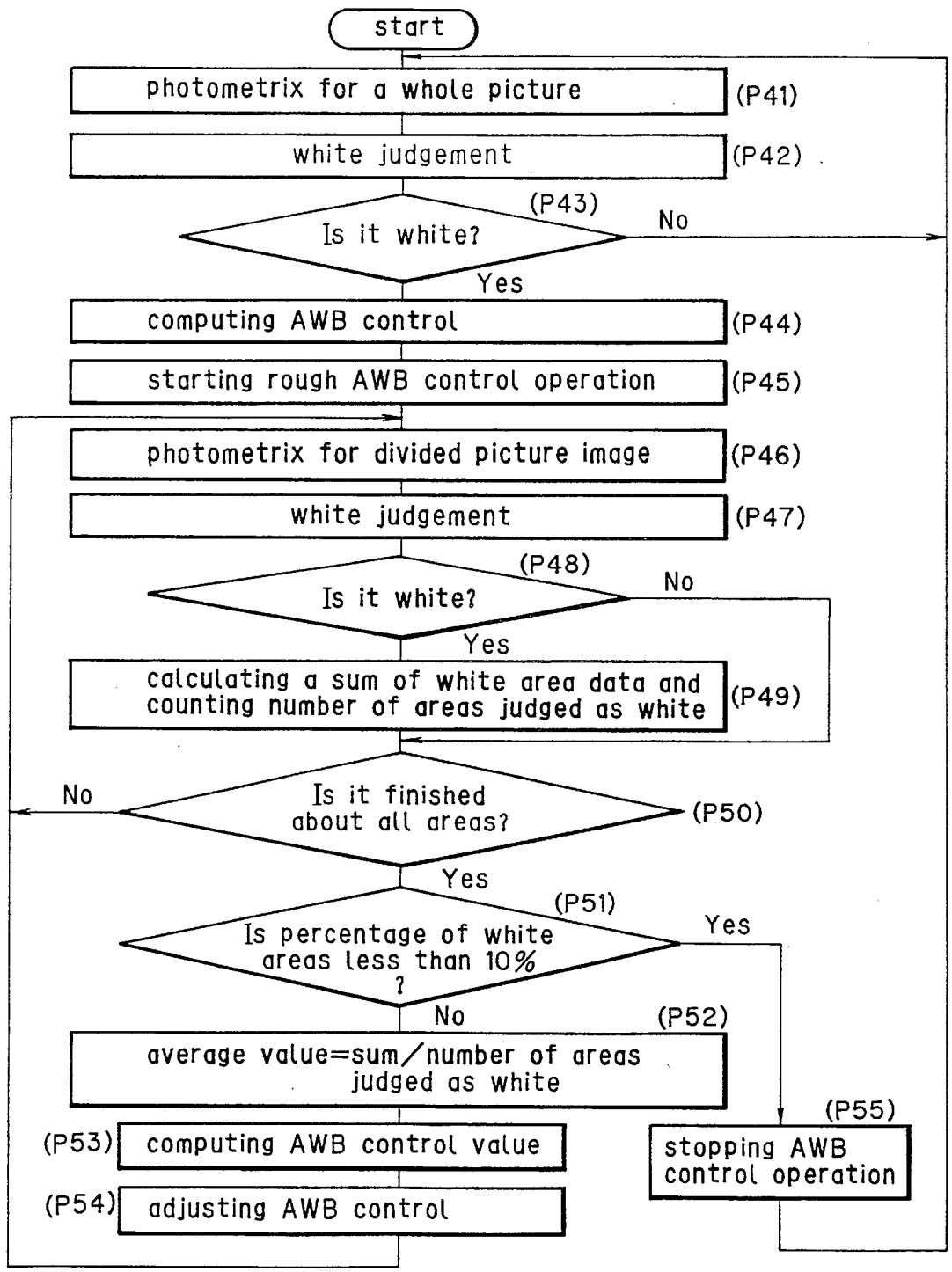
FIG. 10 is a flow chart of an operation for switching a total integrating mode and a separate integrating mode.

FIG. 9A shows a flow chart of an operation in which the second pattern is selected. FIG. 9B shows one of examples of selected areas in the second pattern.

As described above, the operation is divided into the first pattern and the second pattern. White balance can be controlled at every time when the process is finished in each pattern. Each area in the first pattern and each area in the second pattern are located adjacently as shown in FIG. 8B and FIG. 9B so that areas adjacent to a detected area can be supposed to be the similar data. Thus, even if the calculation is operated for the data of half of all areas white balance control can be operated.

With reference to FIG. 5, FIG. 10, FIG. 11 and FIG. 12, it will be described an operation for switching a mode for separately integrating divided picture image and a mode for totally integrating a picture image corresponding to photographing conditions.

When the operation is started, a whole picture image command is output from the picture division control portion 39 of the microcomputor 29 to the picture division circuit 25 in order to process in a whole picture integrating mode. A picture image is not divided to a plurality of sections and signals Y, Cr and Cb corresponding to the whole area of a picture are output to the picture division circuit 25 for every one field. Integrated values IY, ICr and ICb are output from the integrator 27 for every one field (step P41 in FIG. 10). Thus, the whole picture integrating mode is operated.

In the microcomputor 29, the ratios IR/IG and IB/IG are calculated by the matrix computing portion 31 and the white judgment portion 33 judges whether an average color for a whole picture image is substantially white or not (step P42). If the average color is not Judged to be substantially white, the operation is returned to the step P41. If the average color is judged to be substantially white, the control value computing portion 37 outputs the white balance control signals Rcont and Bcont based on the ratios IR/IG and IB/IG obtained by computing signals in the whole area of one picture image (step P44), respectively. White balance is controlled in accordance with the signals Rcont and Bcont in the white balance circuit 19 (step P45). In the case of photometric for a whole picture, the operations are repeated for every one field at high speed so that white balance can be followed up to rapid change of the color temperature.

When an average color of a whole area of one picture image is judged as substantially white in the whole photometric mode (steps P41, P42, P43), the white balance control is operated in the whole picture integrating mode (steps P44, P45). Then, the operation is switched to the dividied picture integrating mode (step P46). That is, the picture division command is output from the picture division control portion 39 and the picture division circuit 25 divides a picture image into a plurality of areas, for example, twenty areas al through a20 (see FIG. 1). In every field, signals corresponding to each area al, a2, . . . ,a18, a20 are independently output in order. In the first field term, the signals Y, Cr and Cb corresponding to the area al are output. In the second field term, the signals Y, Cr and Cb entered into the area a2 are output. Likewise, the signals corresponding to the areas a3, a4, . . . a19, a20 are repeatedly output for every one field in order.

Figure 11:
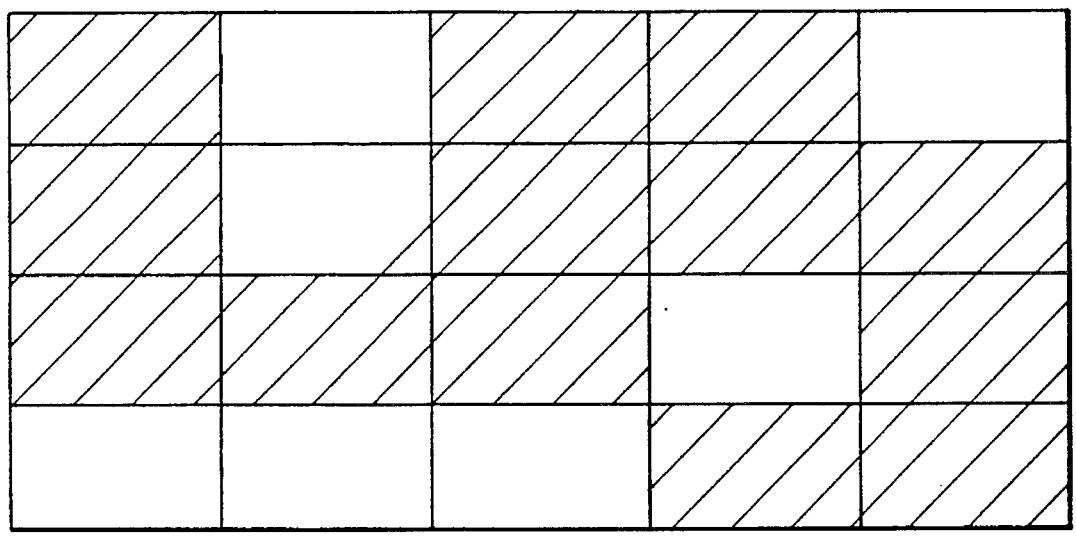
FIG. 11 is one of example showing white areas which are judges as white in a picture image.

The integrator 27 outputs the integrated values IY, ICr and ICb obtained by integrating signals corresponding to each areas for every one field. The white judgement portion 33 judges whether areas are substantially white or not in accordance with average values of the signals corresponding to each areas (step P47). If areas are judged to be substantially white, the ratios IR/IG and IB/IG are added and averaged in the average value adding portion 35 (steps P48, P49). Unless areas are judged as white, the ratios IR/IG and IB/IG are not added. In FIG. 11, white sections mean areas Judged to be substantially white and the other sections mean areas not judged to be substantially white. After finishing the process for the areas a1 through a20 (step P50), it is judged whether a percentage of number of areas judged to be substantially white is equal or less than 10% with respect to the number of the whole areas (step P51). If the percentage is not equal or less than 10%, the average value adding portion 35 calculates total values of the ratios IR/IG and IB/IG of which areas are Judged to be substantially white and the average values AIR/AIG and AIB/AIG by dividing the total values by the number of the areas judged to be substantially white (step P52). The control value computing portion 37 detects white balance control signals Rcont and Bcont in accordance with the average values AIR/AIG and AIB/AIG (step P53). The white balance control circuit 19 controls white balance responded to the white balance control signals Rcont and Bcont (step P54). Such an operation for integrating divided picture image repeatedly (steps P46 through P54).

In the mode for integrating divided sections of a picture, although a process time (=a period for one field x number of divided sections) is long, the signals corresponding to the areas of which average color is judged to be substantially white are only pick up so that white balance can be controlled with high accuracy.

Figure 12:
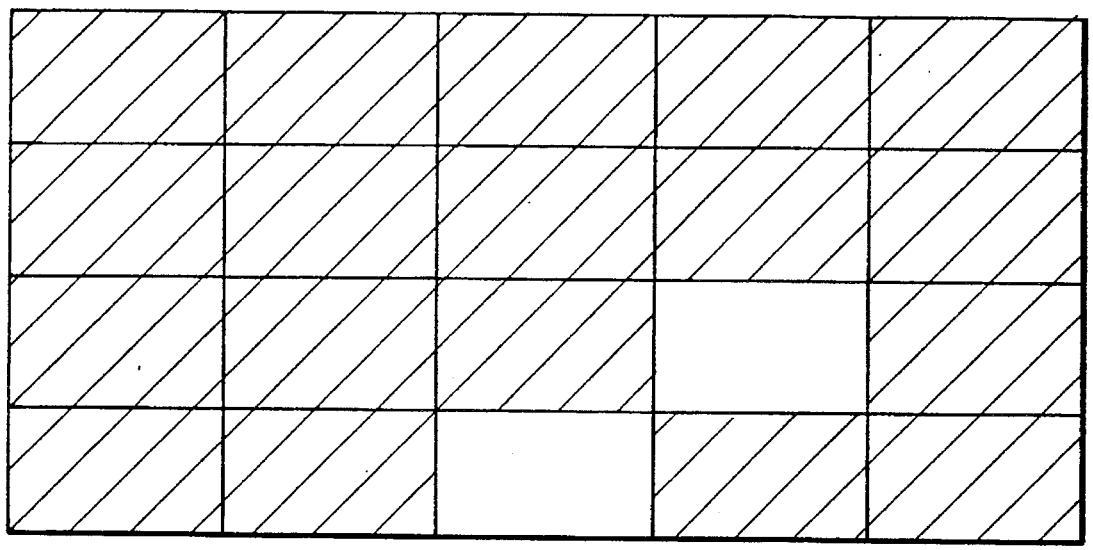
FIG. 12 is another one of examples showing white areas which are judged as white.

In the case that the percentage is equal or less than 10% when the judgement is finished for the areas a1 through a20 (step P51) as shown a condition in FIG. 12, the white balance control is intermitted (step P55) and the operation is changed to the whole picture integrating mode.

In the first embodiment, in the case of an initial period immediately after pushing a photograph button or recording an object of which an average color is not substantially white, white balance is controlled at high speed in the whole picture integrating mode. On the other hand, in case of recording an object of which an average color is substantially white, white balance is controlled with high accuracy in the divided picture integrating mode.

In the case of repeating an operation in the divided picture integrating mode, there are two patterns as shown in FIG. 8B and FIG. 9 B. The both patterns I, II are alternatively processed in order to control white balance.

With reference to FIG. S and FIG. 5, it will be described a white balance control device according to the present invention equipped to a video camera with a power save mode. In a video camera with a power save mode, while a battery switch is turned on without pushing a photograph button, electric power is supplied to only a microcomputer 29 in a photograph system and electric power is not supplied to the other parts in order to save electric power. In the power save mode, an iris is closed, electric power is supplied to mechanical parts and a rotational drum is rotating.

Figure 2:
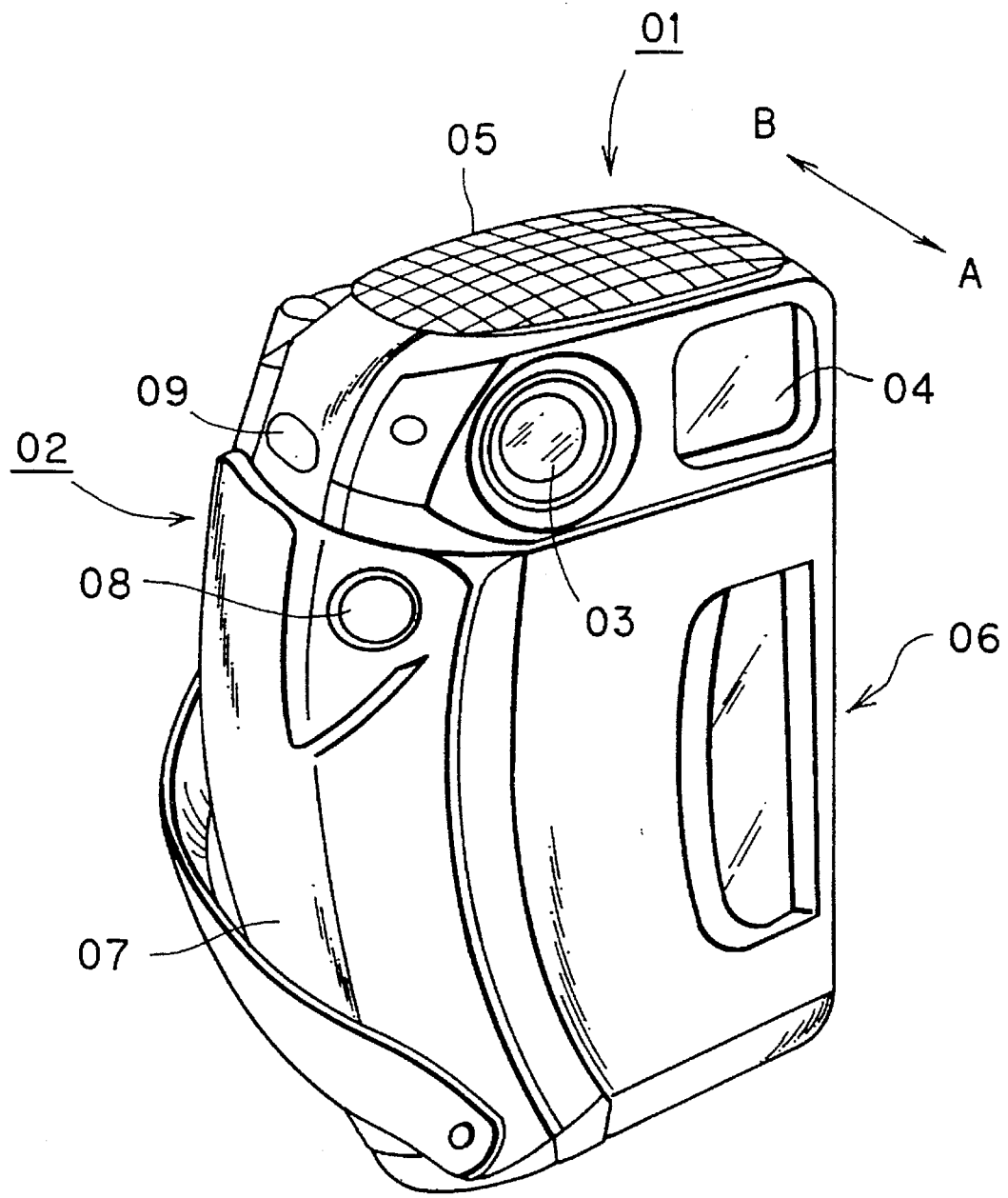
FIG. 2 is a perspective view of a prior art video camera.
Figure 3:
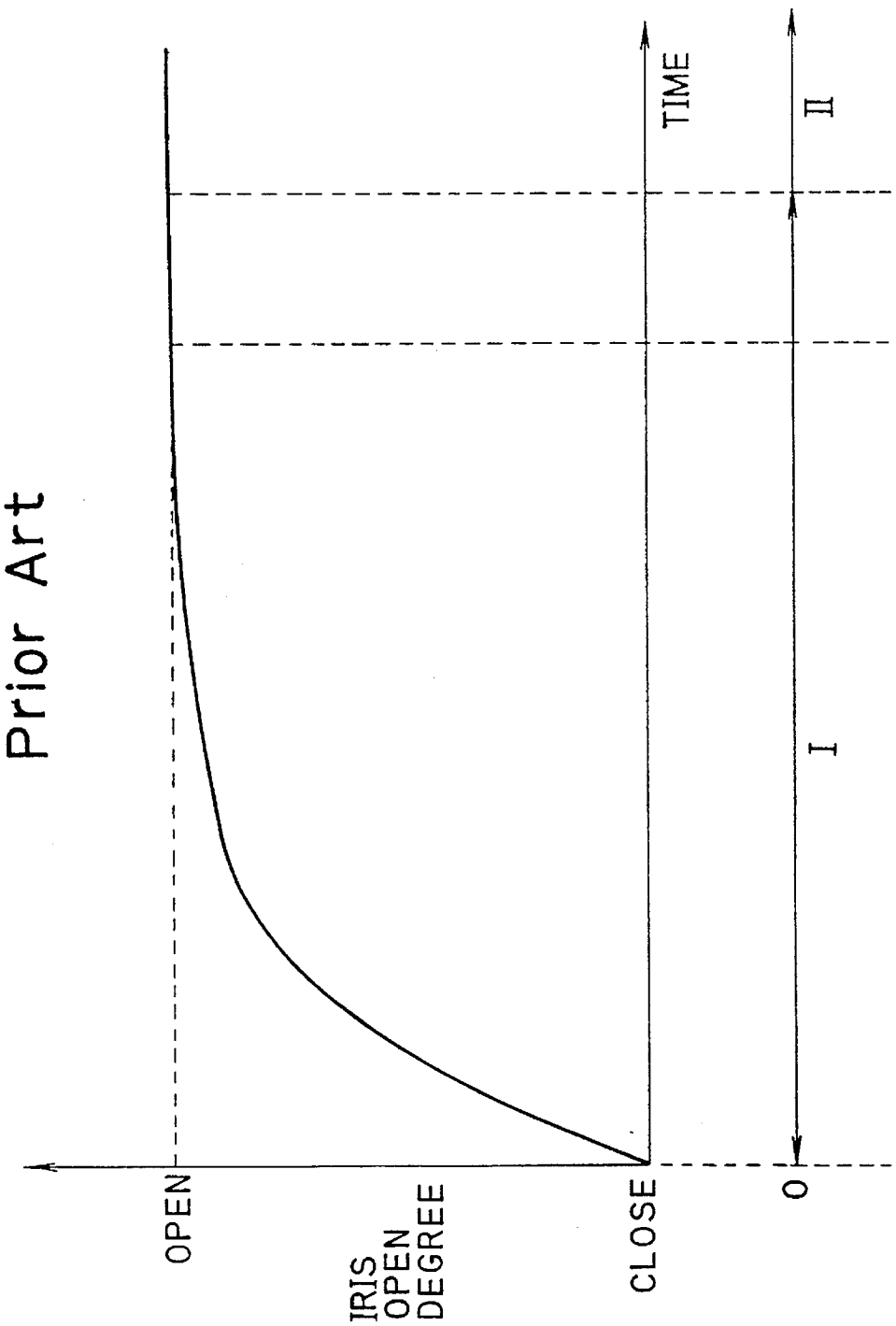
FIG. 3 shows a relation between a time period after pushing a photograph button and an iris open degree operated in one of the prior art embodiments.
Figure 4:
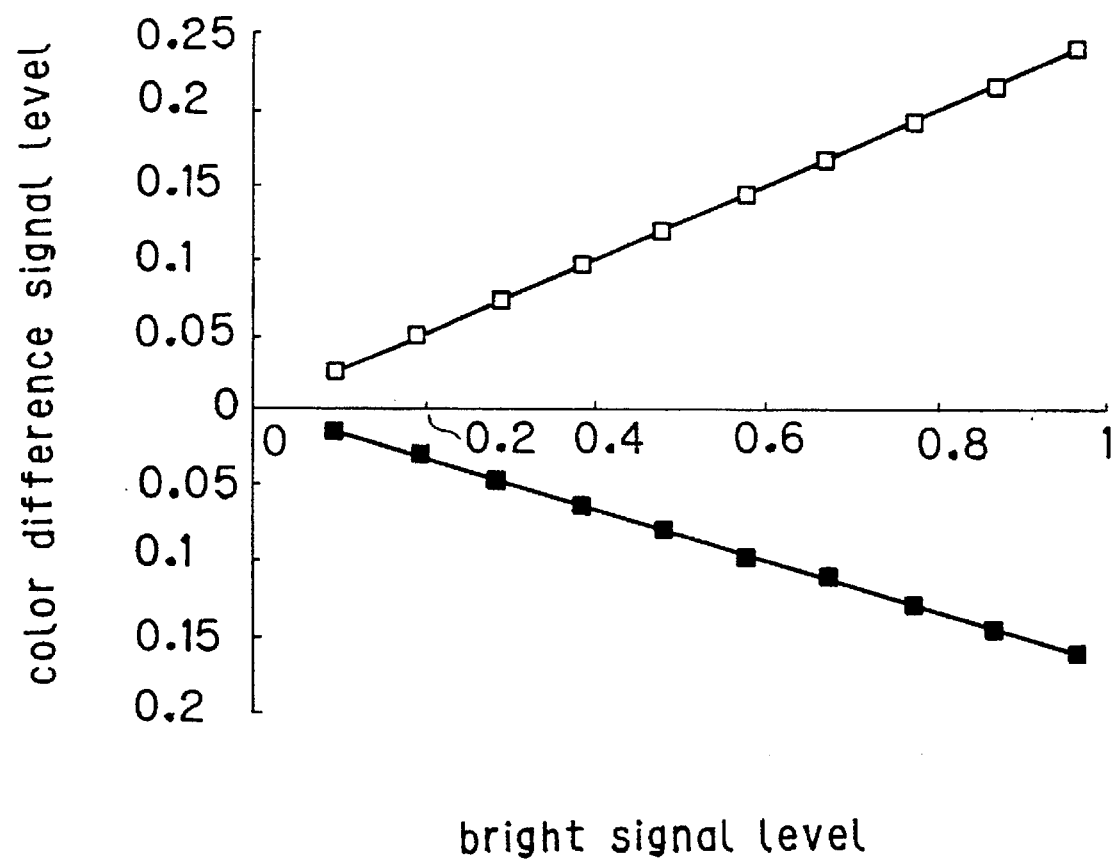
FIG. 4 shows a relation between levels of color-difference signals in the prior art and levels of a brightness signal.

While the battery switch is turned on with pushing the photograph button, electric power is supplied to the whole parts in the photograph system. As shown in FIG. 3, the iris is moved to open at high speed until an exposure level becomes a proper level. After the exposure value becomes a proper level, recording is actually started. When the recording is started actually, proper white balance has to be controlled immediately. Therefore, the microcomputer 29 calculates white balance control signals Rcont and Bcont at high speed (without outputing the control signals Rcont and Bcont) in a period (for example, 0.50 second) behind pushing a battery switch. After the moment when the recording is started (period II in FIG. 3), the white balance control signals Rcont and Bcont are calculated and output. In the period I before starting the recording, the control signals Rcont and Bcont are detected. On the other hand, the values of the white balance control signals Rcont and Bcont become stable in the period II. As the result, the values of the white balance control signals Rcont and Bcont output immediately after starting the recording become proper values in order to control optimum white balance.

In the microcomputer 29, in the period I from pushing the actual photograph button until starting the actual recording, a whole picture integrating command (picture division control signal) DS is output from the picture division control portion 39 to the picture division circuit 25. The picture division circuit 25 outputs the signals Y, Cr and Cb of a whole picture for every one field. The whole picture integrating mode is operated in the integrator 27 and the microcomputer 29 and then the values of the white balance control signals Rcont and Bcont are computed for every one field. Thus, the values are calculated for every one field, the calculation can be finished faster.

In the microcomputer 29, a divided picture integrating command (picture division signal) DS is output from the picture division control portion 39 to the picture division circuit 25 in the period II. The picture division circuit 25 divides a picture image into a plurality of areas, for example, twenty areas a1 through a20 (see FIG. 1). Signals Y, Cr and Cb corresponding to the ares a1 through a20 are output for ever one field in order. The divided picture integrating mode is operated in the integrator 27 and the microcomputer 29 so that white balance control signals for controlling white balance certainly can be calculated and output to the white balance circuit 19 in order to control white balance.

In the above description, the whole picture integrating mode is operated in the period I and the divided picture integrating mode is operated in the period II. However, it may be designed that the divided picture integrating mode is operated in the periods I and II, a number of divided areas may be changed to smaller number (for example, four) in the period I and the number may be changed to larger number (for example, twenty) in the period II.

The period I may be fixed as a predetermined period after pushing the photograph button. Further, the moment to start recording actually may be designed to be a moment after the predetermined time from after an iris has become stable.

The values of the white balance control signals Rcont and Bcont are calculated at high speed in the period I so that the values of the signals Rcont and Bcont can become stable in the second half of the period I. The first values of the signals Rcont and Bcont in the period II become proper values in order to control white balance properly.

As described above, in the first embodiment of the present invention, the first characteristic is able to control white balance at high speed. The second characteristic is to able to control white balance properly corresponding to photograph conditions. The third characteristic is to able to control white balance stably when the recording is just started.

With reference to FIG. 13 through FIG. 17, the second embodiment of the present invention will be described.

Figure 13:
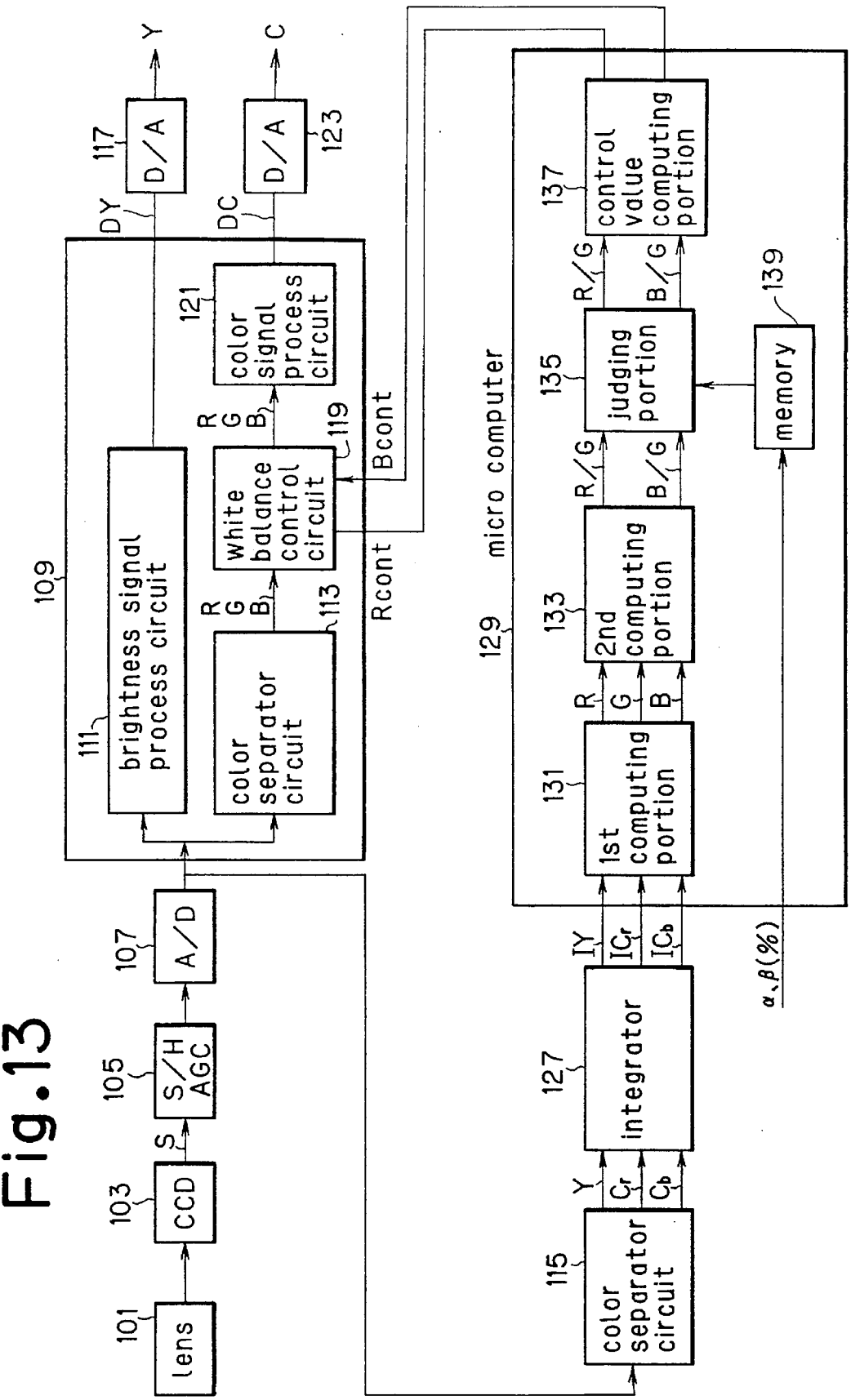
FIG. 13 shows a circuit of photographing system utilized for the second embodiment of a video camera according to the present invention.

FIG. 13 is the circuit of the photograph system in the video camera according to the second embodiment of the present invention. In the second embodiment, a complementary color filter is utilized. As shown in FIG. 13, an optical picture image is formed on a light receiving surface of a charge coupled device 103 with a complementary color filter through a lens 101. The charge coupled device 103 outputs a photograph signal S. The photograph signal S is sample/hold processed and gain controlled in a sample/hold and automatic gain control (AGC) circuit 105. Then the signal is converted to a digital signal by an analog/digital convertor 107 and the digital signal is input to a brightness signal process circuit 111 and a color separator circuit 113 in a signal process circuit 109 and a different color separator circuit 115.

The brightness signal process circuit 111 outputs a digital brightness signal DY by processing the signal S. In a digital/analog convertor 117, the digital brightness signal DY is converted to an analog brightness signal Y and output. The color separator circuit 113 outputs three elementary color signals R, G and B by processing the signal S. In a white balance control circuit 119, the three elementary color signals R, G and B are controlled white balance corresponding to white balance control signals Rcont and Bcont. Such white balance controlled elementary color signals R, G and B are processed and converted to a digital color signal DC by a color signal process circuit 121. The digital color signal DC is converted to an analog color signal C and output in a digital/analog convertor 123.

In the color separator circuit 115, the signal S is processed and a digital brightness signal Y, color combination signals Cr, and Cb are output. An integrator 127 and a microcomputer 129 are successively connected to the color separator 115 in order. The microcomputer 129 comprises a first computing portion 131, a second computing portion 133, a judging portion 135 for judging color temperature detecting regions, a control value computing portion 137 and a memory portion 139.

Figure 14:
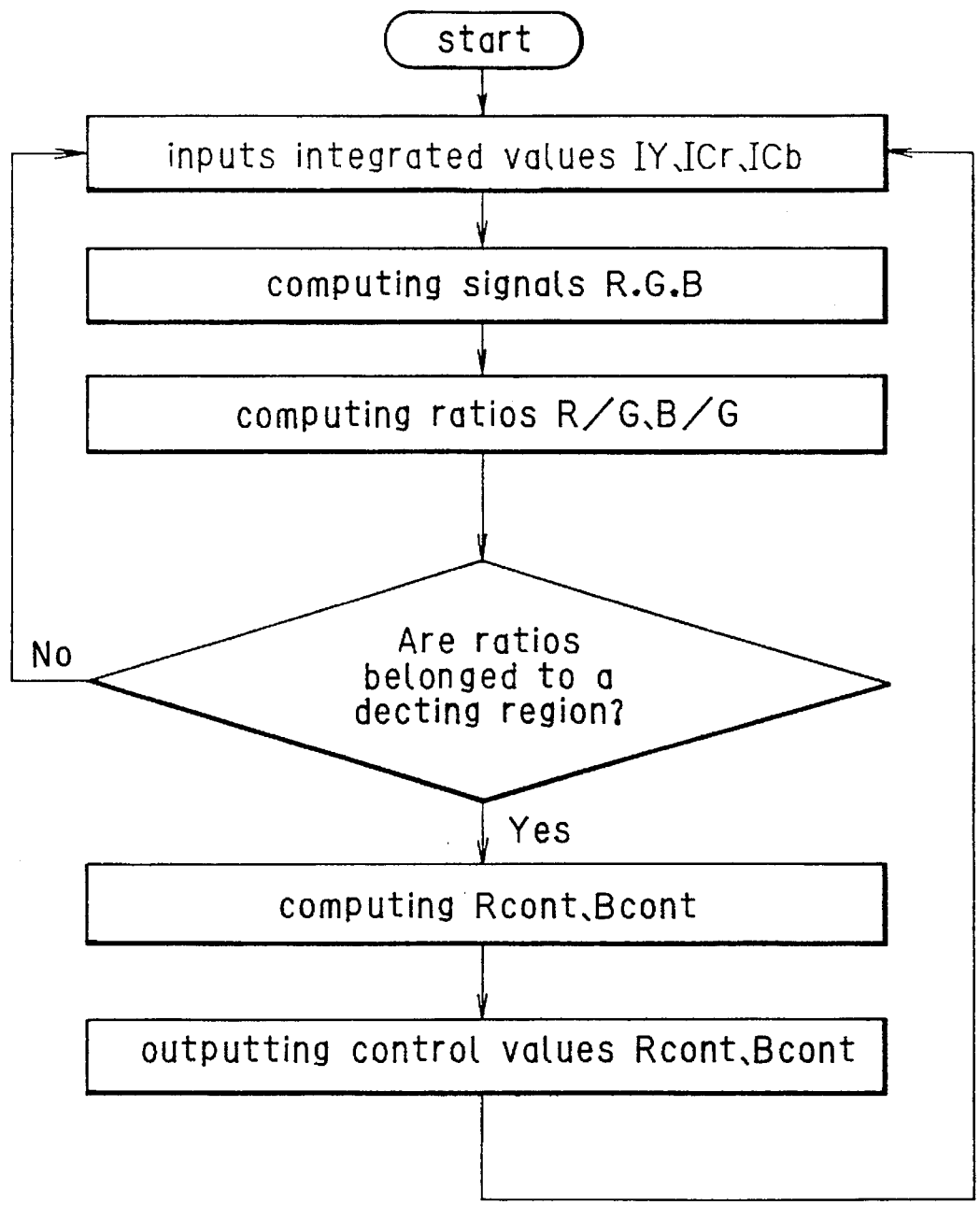
FIG. 14 shows a flow chart for a basic control operation of a microcomputer in the second embodiment.

A flow chart of a basic operation of the microcomputer 129 is shown in FIG. 14. The integrator 127 integrates signals Y, Cr and Cb and outputs integrated values IY, ICr and ICB to the first computing portion 131. In the first computing portion 131, color signals of each elementary colors R, G, B are output to the second computing portion 133, In the second computing portion 133, ratios R/G and B/G are output to the judging portion 135. The judging portion 135 judges whether these calculated ratios R/G and B/G are belonged to a predetermined color temperature detecting region (including a color temperature detecting axis or color temperature detected points). Control values Rcont and Bcont are calculated based on a color temperature detecting axis which is designed as sunshine in accordance with the ratios R/G and B/G in the computing portion.

In addition, the memory portion 139 memorizes an acceptable gap α (%) for the ratio R/B and an acceptable gap β(%) for the ratio B/G with respect to a color temperature detecting axis. The judging portion 135 outputs the ratios R/G and B/G to the control value computing portion 137 by adjusting the color temperature detecting axis under the consider of the acceptable gaps α and β (%), respectively.

Figure 15:
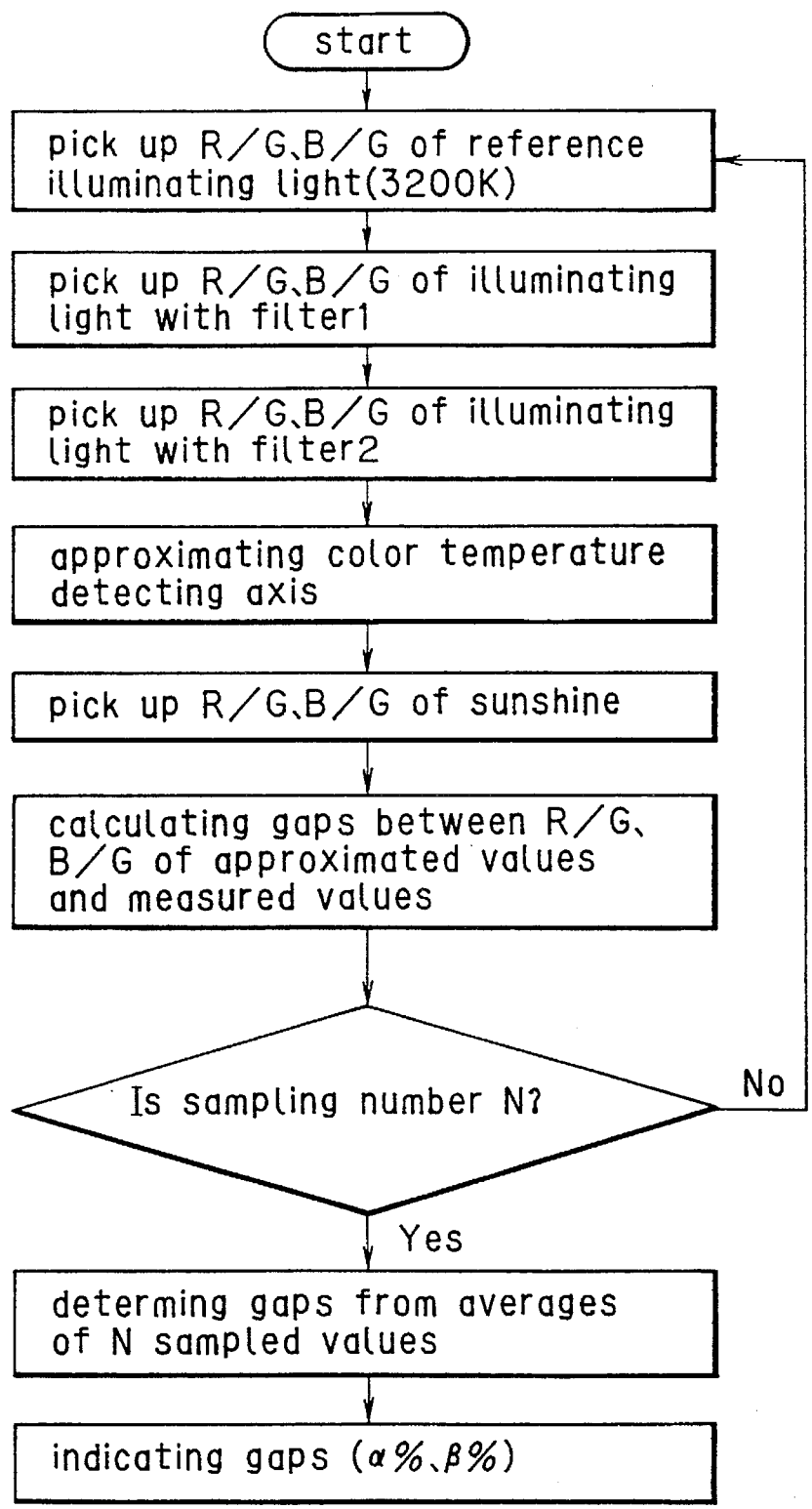
FIG. 15 shows a flow chart for determining a gap between an approximate color temperature line and an actual sunshine value in the second embodiment.
Figure 17:
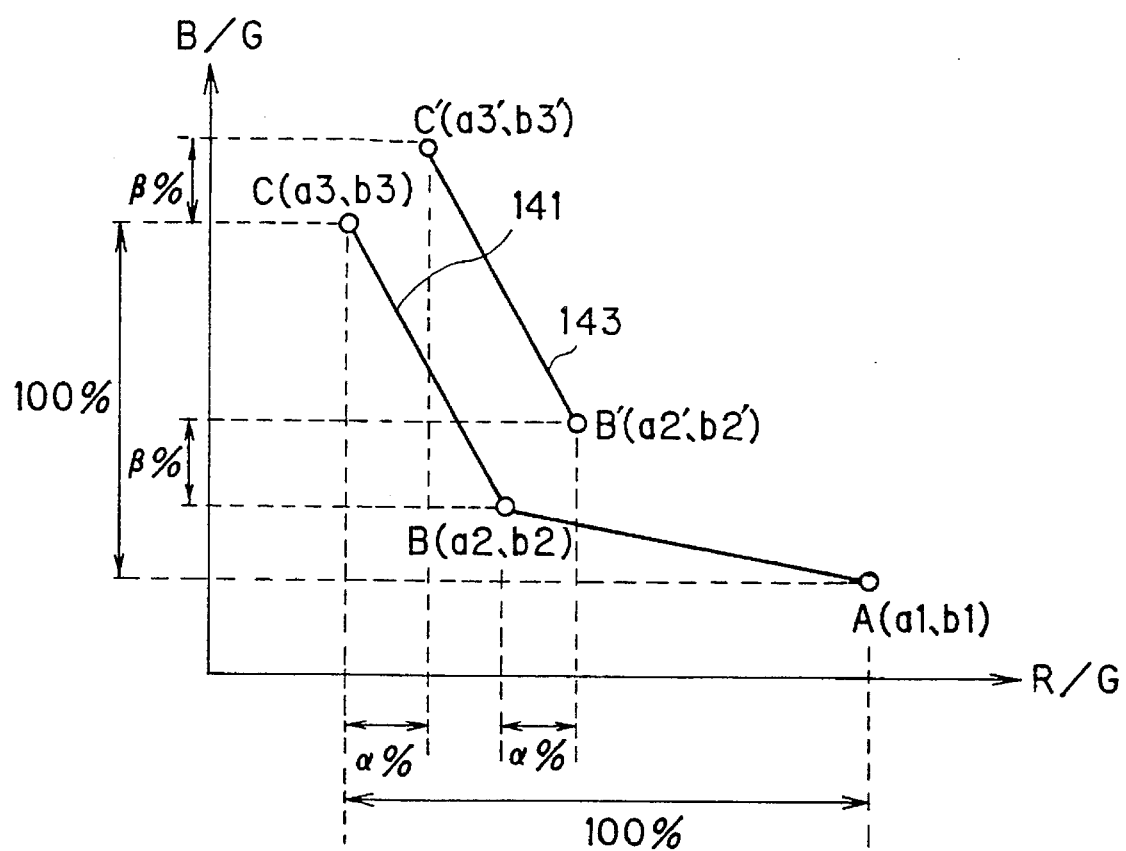
FIG. 17 shows a color temperature detecting region with respect to sunshine in the second embodiment.

The acceptable gaps α and β have been determined in accordance with experimental data. FIG. 15 shows a flow chart how acceptable gaps α and β are determined corresponding to sunshine light. For example, a reference lamp having color temperature 3200K is photographed by a video camera in order to obtain the data of the ratios R/G and B/G. In the next, a first color temperature converter filter for 4000K is attached to the reference lamp and the reference lamp with the first color temperature converter filter is photographed by the video camera in order to obtain the data of the ratios R/G and B/G. A second color temperature converter filter for 7500K is attached to the reference lamp and the reference lamp with the second color temperature converter filter is photographed by the video camera in order to obtain the data of the ratios R/G and B/G. By gathering these three kinds of the data, a color temperature detecting axis 141 with respect to sunshine light can be approximated as shown in FIG. 17. Then, natural sunshine light is photographed in order to obtain the data of the ratios R/G and B/G. Comparing with the both data, gaps between the approximate color temperature of the reference light and the color temperature of natural sunshine are calculated. Such a data pick-up sampling is repeated for some (N) video cameras. Average gaps α and β are calculated for the data pick up from N video cameras. These average gaps α and β are recognized as the differences (100%) between the highest value and the lowest value of the ratios R/G and B/G of the color temperature detecting axis, respectively.

The determined gaps α and β (%) are stored in a memory portion 139 of each video camera in a product operation.

Figure 16:
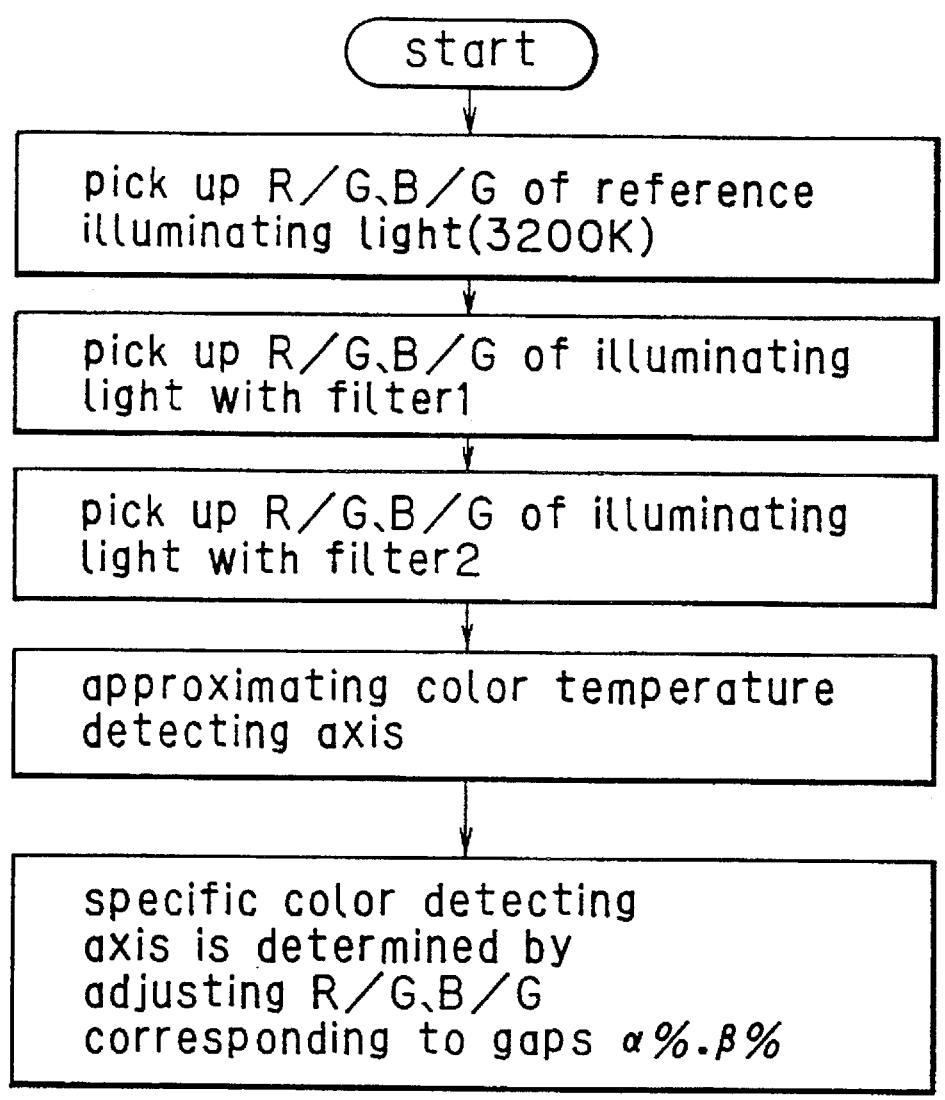
FIG. 16 shows a flow chart for determining a color temperature detecting region with respect to sunshine in the second embodiment.

FIG. 16 shows a flow chart of an operation for controlling white balance of each video camera in a product operation. Firstly, a reference illuminating lamp of which light having the color temperature 3200K is photographed and the ratios R/G and B/G are calculated. The ratios correspond to a point A (a1, b1) in FIG. 17. The first color temperature converter filter is attached to the reference illuminating lamp. The illuminating light with the first color temperature converter filter is photographed and the ratios R/G and B/G are calculated. The ratios correspond to a point B (a2, b2) in FIG. 17. Then, the second color temperature converter filter is attached to the reference illuminating lamp. The illuminating light with the second color temperature converter filter is photographed and the ratios R/G and B/G are calculated. The ratios R/G and B/G correspond to a point C (a3, b3) in FIG. 17. These data are stored in a memory (not shown) in the microcomputer 129. In accordance with the stored data, the judging portion 135 approximates a color temperature detecting axis 141 as shown in a A-B-C line in FIG. 17. The color temperature detecting axis 141 are slidable within an acceptable region determined by the gaps α and β (%) stored in the memory portion 139 as shown a B'-C' line in FIG. 17. This lin B'-C' is recognized as the specific color temperature axis 143 corresponding to sunshine in the respective video camera.

In FIG. 17, it is assumed that the color temperature converter axis measured under real sunshine is parallel to the approximated color temperature converter axis measured under the reference illuminating lamp. In the case of moving the color temperature converter axis from the line B-C to the line B'-C', the moved points B'(a2', b2') and C' (a3', b3') are calculated along the following equations:

$$a2'=a2+(a1-a3)\times(\alpha/100)$$

$$b2'=b2+(b3-b1)\times(\beta/100)$$

$$a3'=a3+(a1-a3)\times(\alpha/100)$$

$$b3'=b3+(b3-b1)\times(\beta/100)$$

In the above example, the line B-C and the line B'-C' are assumed to be parallel each other. Unless the lines are parallel each other, the points B and C may be moved under the consideration of predetermining the gaps (%) of the ratios R/G and B/G, respectively. The color temperature detecting axis 143 is not only the line B'-C' as shown in FIG. 17. It is possible to provide an acceptable width with considering the gaps. If the gaps α and β are determined once for one specific type of a video camera, the gaps may be stored as the constant numbers in a software for the microcomputer 129 or proper numbers in an electrical erasable programable read only memory (EEPROM).

As described above, the differences between the highest values and the lowest values of the ratios R/G and B/G are recognized as 100% for each points A, B and C. Thus, the gaps (%) with respect to sunshine can be predetermined, respectively. Even if a complementary color filter has a respective dispersion, the gaps (%) are constant. The dispersion caused by a charge coupled device and the other reasons can be reduced by adjusting the gaps so that a proper white balance can be controlled.

Figure 18:
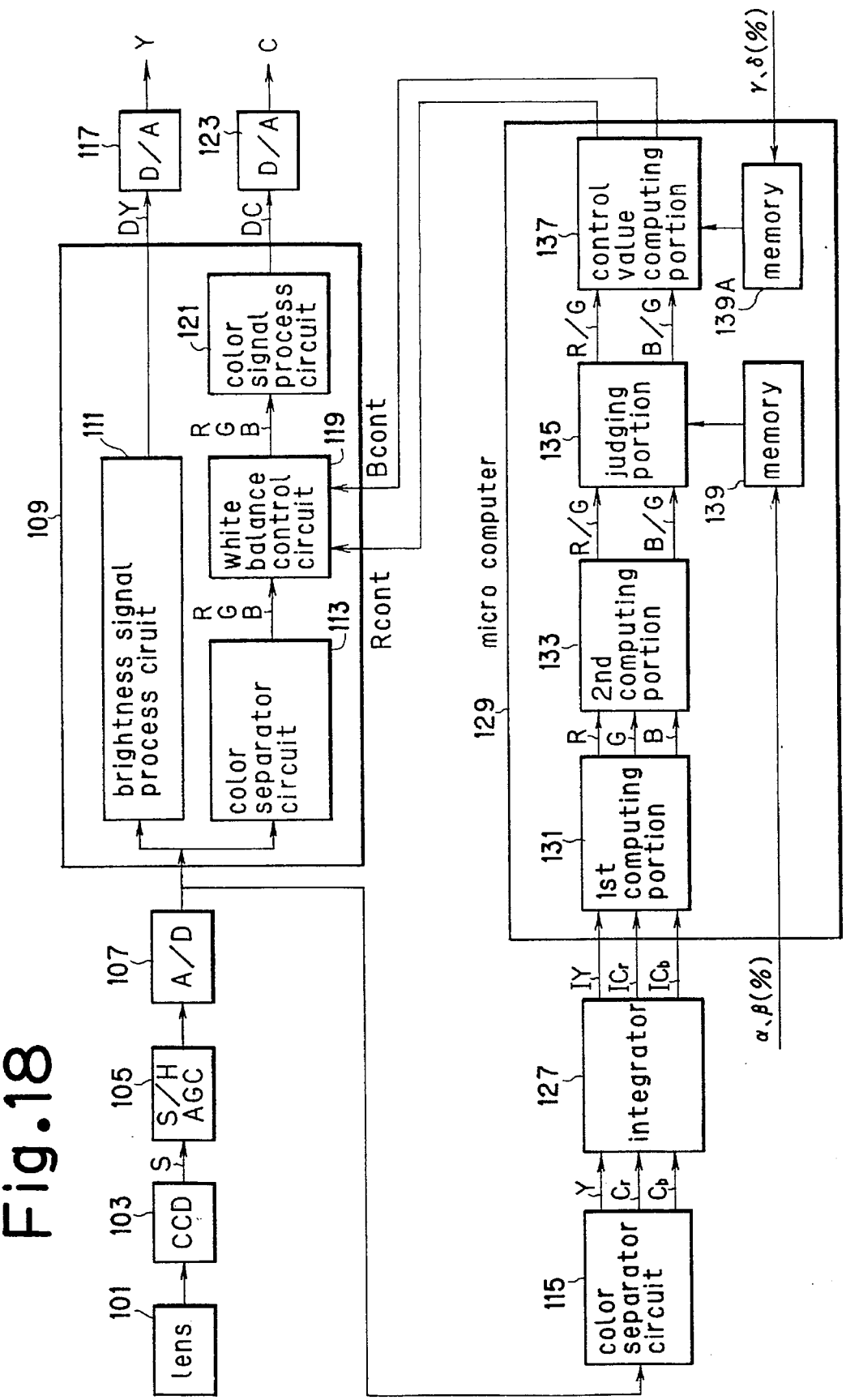
FIG. 18 shows a circuit of photographing system utilized for the third embodiment of a video camera according to the present invention.

The third embodiment according to the present invention is shown in FIG. 18 through FIG. 21. FIG. 18 shows a circuit of a photograph system of the third embodiment of the video camera of the present invention. Upon comparing with the second embodiment as shown in FIG. 13 and the third embodiment, a memory section 139A is added to the microcomputer 129 and a new performance is added to the microcomputer 137 in the third embodiment. The other elements in the third embodiment are the same to the corresponding elements in the second embodiment.

The microcomputer 129 stored the gap γ(%) for the control signal Rcont and the gap δ (%) for the control signal Bcont corresponding to he color temperature control axis as well as a basic operation as shown in FIG. 14. The computing portion 137 computes the control values Rcont and Bcont by adjusting the color temperature control axis with consideration of the gaps γ and δ (%) and outputs the control values Rcont and Bcont to the white balance control circuit 119.

Figure 19:
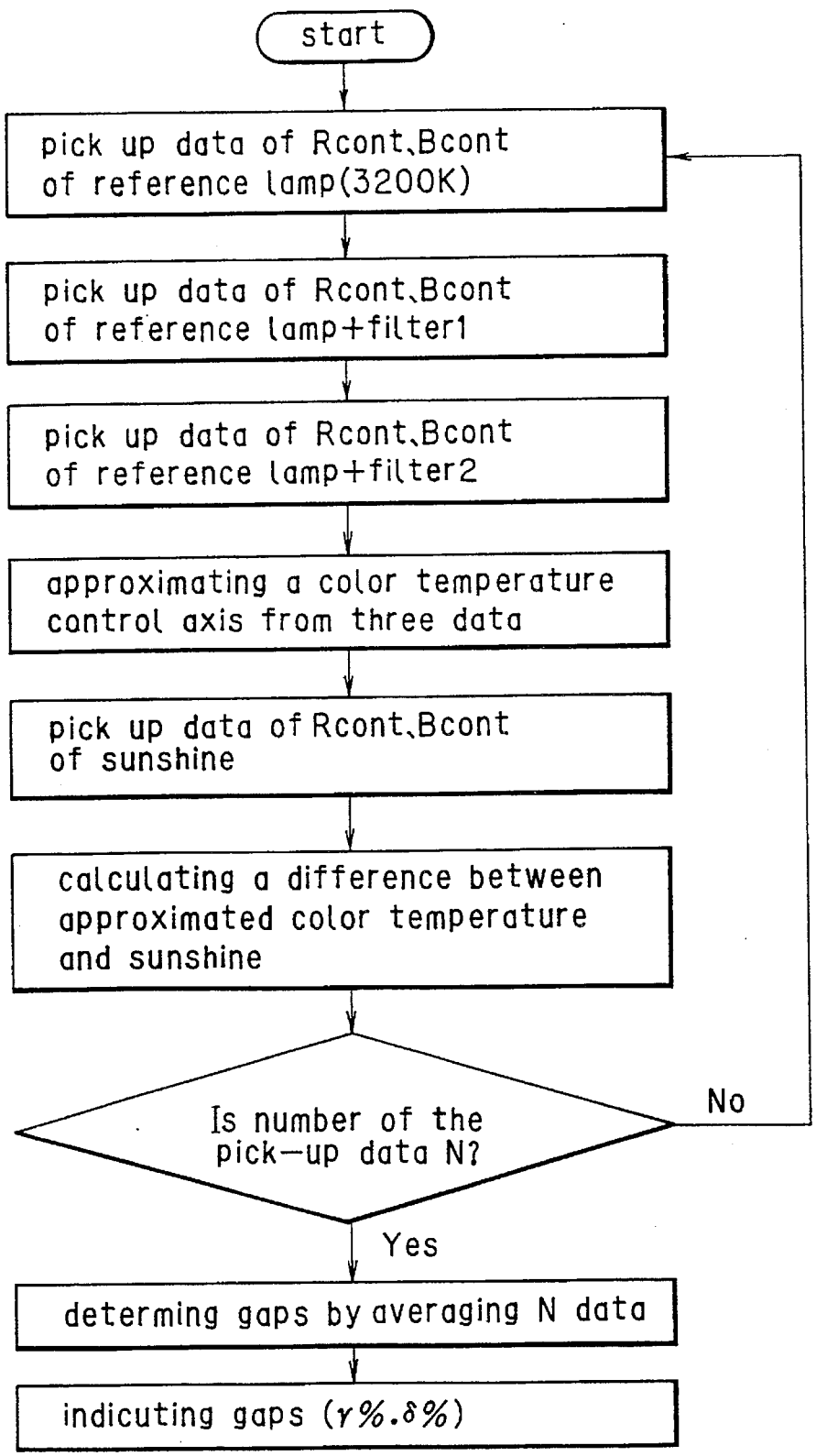
FIG. 19 shows a flow chart for determining a gap between an approximate color temperature line and an actual sunshine value in the third embodiment.

The acceptable gaps γ and δ are determined in accordance with experimental data of a lot of video cameras. FIG. 19 shows a flow chart how acceptable gaps γ and δ are determined corresponding to sunshine light. For example, a reference lamp having color temperature 3200K is photographed by a video camera in order to obtain the data of the control signals Rcont and Bcont. In the next step, a first color temperature converter filter for color temperature 4000K is attached to the reference lamp and the reference lamp with the first color temperature converter filter is photographed by the video camera in order to obtain the data of the control signals Rcont and Bcont. A second color temperature converter filter for color temperature 7500K is attached to the reference lamp and the reference lamp with the second color temperature converter filter is photographed by the video camera in order to obtain the data of the control signals Rcont and Bcont. By gathering three kinds of data, a color temperature control axis 145 corresponding to sunshine light can be approximated as shown a A-B-C line in FIG. 21. Then, natural sunshine light is photographed in order to obtain the data of the control signals Rcont and Bcont. Comparing with the both data of natural sunshine and reference illiminating lamp, gaps between the approximate color temperature of the reference light and the color temperature of natural sunshine are calculated. Such a data pick-up operation is repeated for some (N) video cameras. Average gaps γ and δ are determined by inputing the data pick up from N video cameras. These average gaps γ and δ are corresponding to the differences (100%) between the highest value and the lowest value of the control signals Rcont and Bcont of the color temperature control axis.

The determined gaps γ and δ(%) are stored into a memory portion 139A of each video camera in a producting operation.

Figure 20:
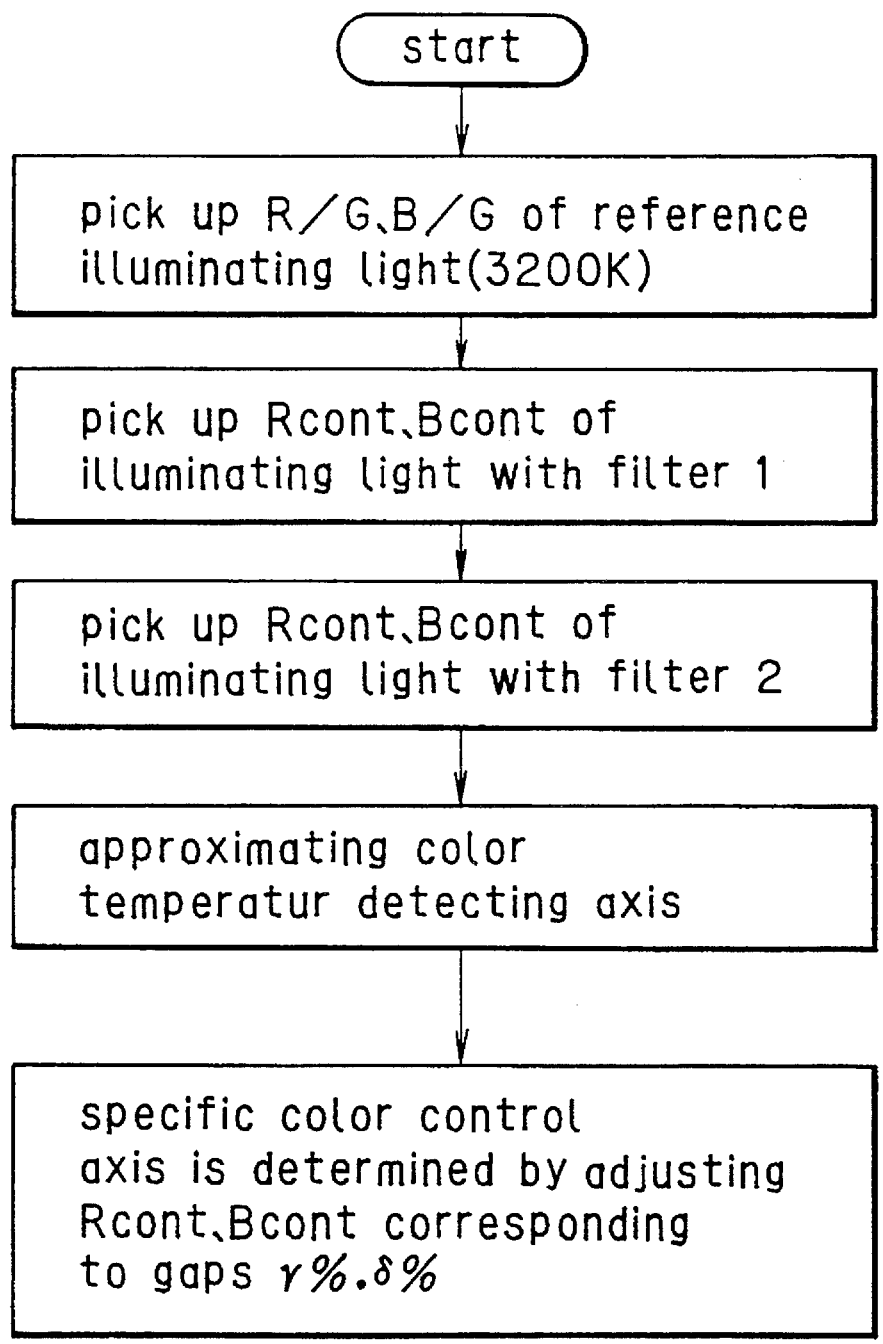
FIG. 20 shows a flow chart for determining a color temperature detecting region with respect to sunshine in the third embodiment.

FIG. 20 shows a flow chart of an operation for controlling white balance of each video camera in a product operation. Firstly, a reference illuminating lamp of which the color temperature is 3200K is photographed and the values of the control signals Rcont and Bcont are calculated. The values correspond to a point A (R1, B1) in FIG. 21. The first color temperature converter filter is attached to the reference illuminating lamp. The illuminating light with the first color temperature converter filter is photographed and the values of the control signals Rcont and Bcont are calculated. The values correspond to a point B (R2, B2) in FIG. 21. Then, the second color temperature converter filter is attached to the reference illuminating lamp. The illuminating light with the second color temperature converter filter is photographed and the values of the control signals Rcont and Bcont are calculated. The values correspond to a point C (R3, B3) in FIG. 21. These data are stored in a memory section (not shown) in the microcomputer 129. In accordance with the stored data, the computing portion 137 approximates a color temperature control axis 145 as shown a A-B-C line in FIG. 21. The points of the color temperature control axis 145 are movable to the different points (B', C') corresponding to the gaps γ and δ memorized in the memory portion 139. This axis formed by a line B'-C' is recognized as the specific color temperature control axis 147 with respect to sunshine in the adjusted video camera.

Figure 21:
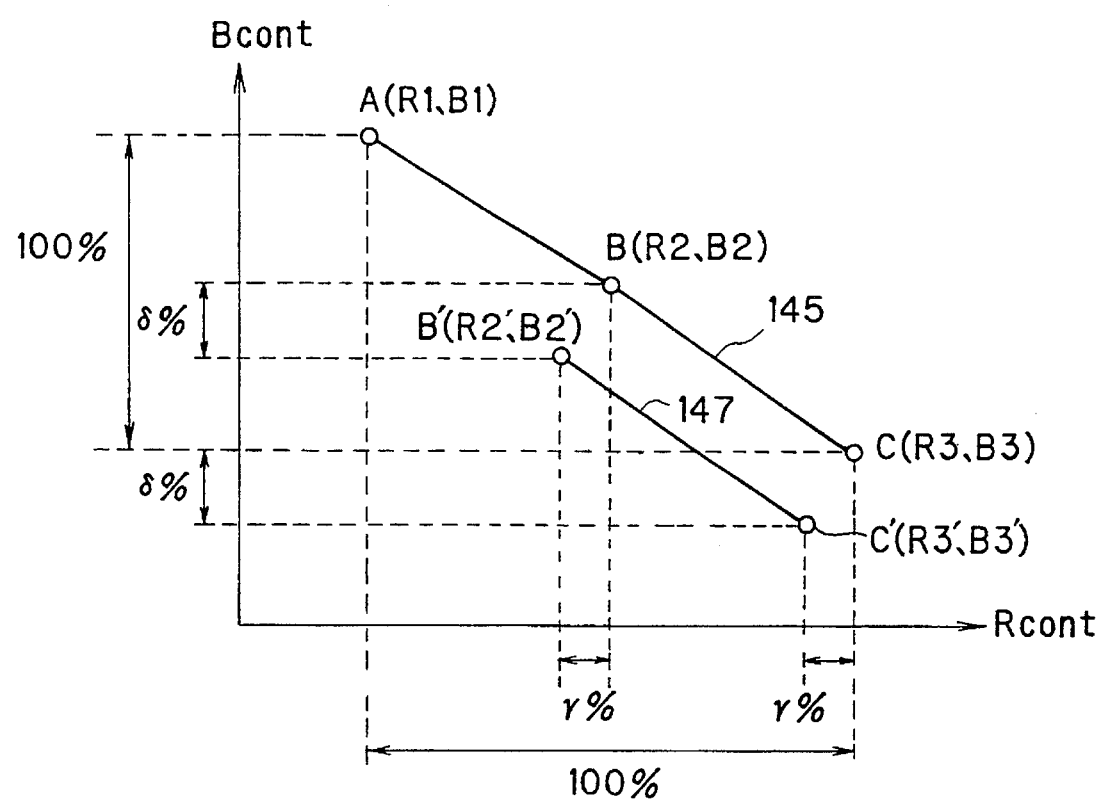
FIG. 21 shows a color temperature detecting region with respect to sunshine in the third embodiment.

In FIG. 21, it is assumed that the color temperature converter axis measured under real sunshine is parallel to the approximated color temperature converter axis measured under the reference illuminating lamp. In the case of moving the line B-C to the line B'-C', the moved points B'(R2', B2') and C' (R3', B3') are calculated along the following equations.

$$R2'=R2+(R3-R1)\times(\gamma/100)$$

$$B2'=B2+(B1-B3)\times(\delta/100)$$

$$R3'=R3+(R3-R1)\times(\gamma/100)$$

$$B3'=B3+(B1-B3)\times(\delta/100)$$

In the above example, the line B-C and the line B'-C' are assumed to be parallel each other. Unless the lines are parallel, the points B and C may be moved by predetermining the gaps (%) of the values of the control signals Rcont and Bcont, respectively. The color temperature control axis 147 is not limited the line as shown in FIG. 21. It is possible for the color temperature control axis 147 to provide an acceptable width depending on the gaps. If the gaps γ and δ are determined once for one type of video cameras, the gaps may be memorized as the constant numbers in a software for the microcomputer 129 or memorized proper numbers in an electrical erasable programable read only memory (EEPROM). If the memory can be rewritten, white balance can be individually controlled for each video cameras.

As described above, the differences between the highest values and the lowest values of the control signals Rcont and Bcont are recognized as 100% for each points A, B and C, respectively. Thus, the gaps (%) with respect to sunshine is predetermined. Even if a complementary color filter has an individual dispersion, the gaps (%) is constant. The dispersion caused by a charge coupled device and the other devices can be reduced by adjusting the gaps so that white balance can be controlled properly.

Figure 22:
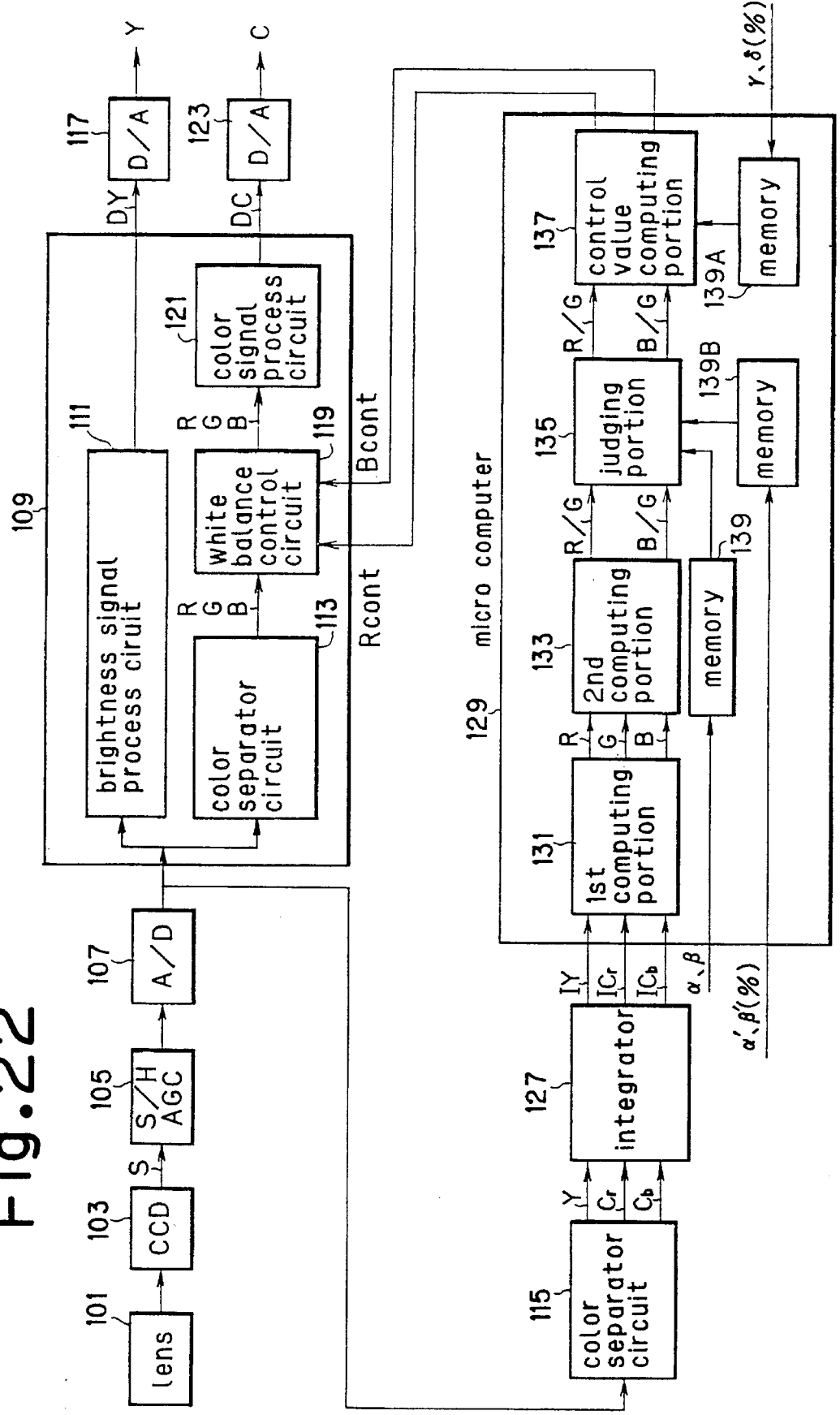
FIG. 22 shows a circuit of photographing system utilized for the fourth embodiment of a video camera according to the present invention.

The fourth embodiment according to the present invention is shown in FIG. 22 through FIG. 25. FIG. 22 shows a circuit of a photograph system of the fourth embodiment of the video camera of the present invention. Upon comparing with the third embodiment as shown in FIG. 18 and the fourth embodiment, a memory section 139B is added to the microcomputer 129 and a new performance is added to the microcomputer 129 in the fourth embodiment. The other equipments in the fourth embodiment are the same to the corresponding equipments in the third embodiment.

The microcomputer 129 memorizes a gap α' for the ratio R/G and a gap β' for the ratio B/G in the color temperature detecting region with respect to the reference fluorescent illuminating lamp in the memory portion 139B in order to photograph for indoor-use as well as the basic operation as shown in FIG. 14. The judging portion 135 detects the color temperature ratios R/G and B/G by determining a color temperature detection region with respect to the predetermined illuminating light in accordance with the gaps α', β' and outputs the controlled ratios R/G and B/G to the computing portion 137.

Figure 23:
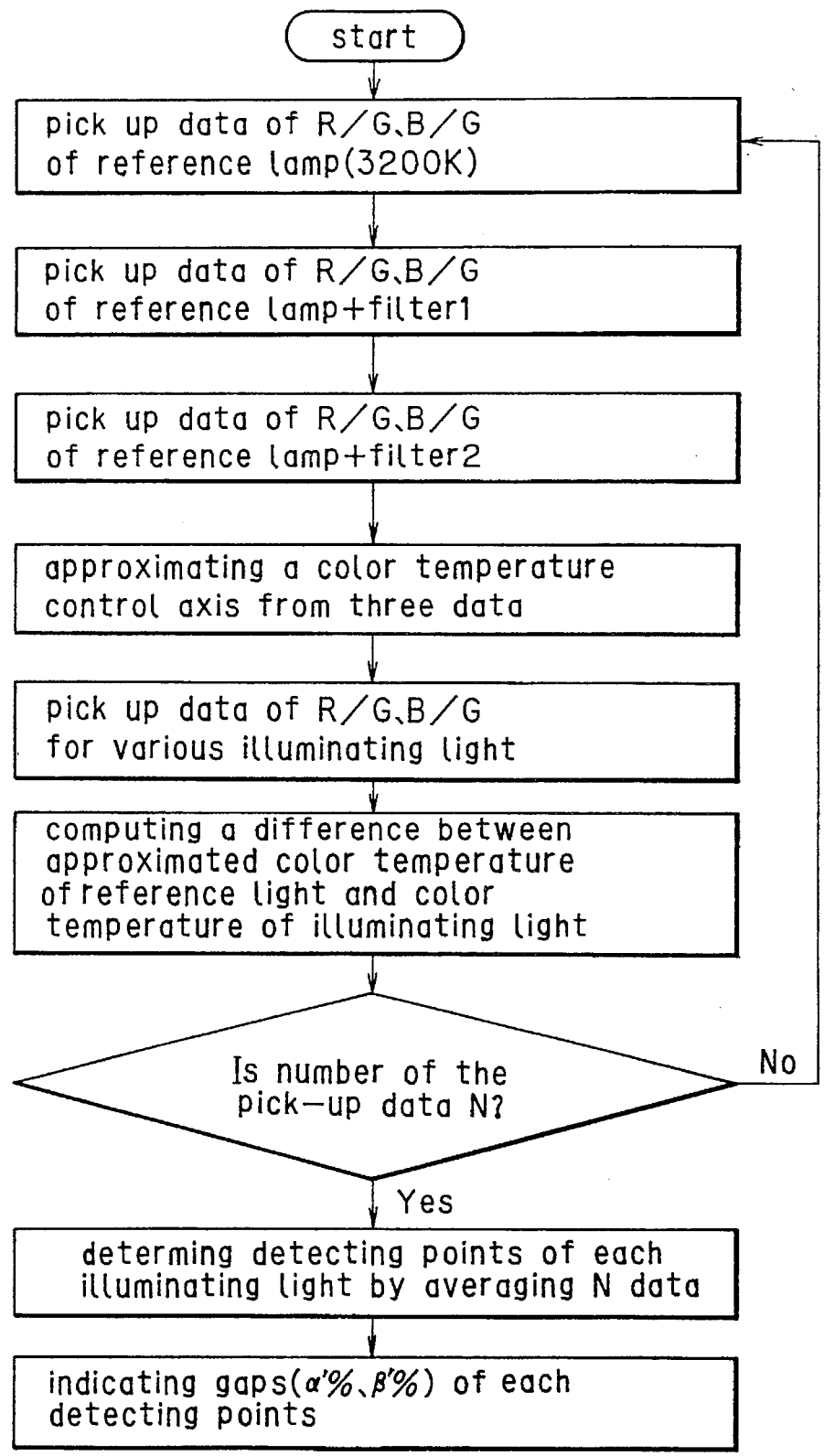
FIG. 23 shows a flow chart for determining a gap between an approximate color temperature line and an actual fluorescent lamp value in the fourth embodiment.

The acceptable gaps α' and β' are determined in accordance with experimental data of a lot of video cameras. FIG. 23 shows a flow chart how acceptable gaps α' and β' are determined with respect to fluorescent illuminating light. For example, a reference lamp having a color temperature of 3200K is photographed by a video camera in order to obtain the data of the ratios R/G and B/G. In the next step, a first color temperature converter filter for color temperature 4000K is attached to the reference lamp and the reference lamp with the first color temperature converter filter is photographed by the video camera in order to obtain the data of the ratios R/G and B/G. A second color temperature converter filter for color temperature 7500K is attached to the reference lamp and the reference lamp with the second color temperature converter filter is photographed by the video camera in order to obtain the data of ratios R/G and B/G. By gathering three kind of data, a color temperature detecting axis 149 with respect to fluorescent light can be approximated as shown the line A-B-C in FIG. 25. Then, fluorescent light is photographed in order to obtain actual data of the ratios R/G and B/G. Comparing with the both kinds of data, gaps between the approximate color temperature of the reference light and the color temperature of fluorescent light are calculated. Such a data pick-up operation is repeated for some (N) video cameras. Average gaps α' and β' are determined by the data from N video cameras. These average gaps α' and β' are corresponding to the differences (100%) between the highest value and the lowest value of the ratios R/G and B/G of the color temperature detecting axis.

The determined gaps α' and β' (%) are stored into a memory portion 139B of each video camera in a producting operation.

Figure 24:
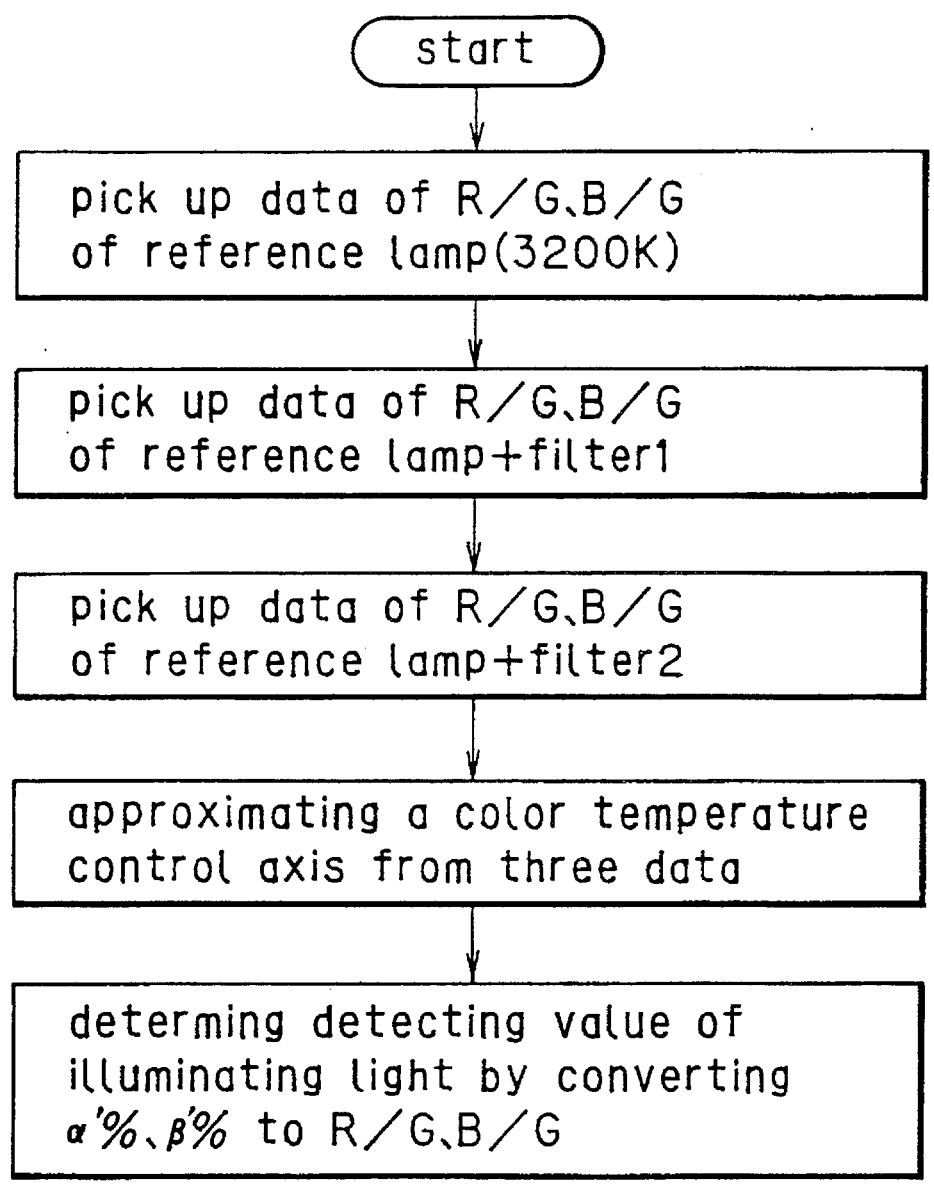
FIG. 24 shows a flow chart for determining a color temperature detecting region with respect to a fluorescent lamp in the fourth embodiment.

FIG. 24 shows a flow chart of an operation for controlling white balance of each video camera in a product operation. Firstly, a reference illuminating lamp having a color temperature of 3200K is photographed and the ratios R/G and B/G are measured. The ratios correspond to a point A (a1, b1) in FIG. 25. The first color temperature converter filter is attached to the reference illuminating lamp. The illuminating light with the first color temperature converter filter is photographed and the ratios R/G and B/G are measured. The ratios correspond to a point B (a2, b2) in FIG. 25. Then, the second color temperature converter filter is attached to the reference illuminating lamp. The illuminating light through the second color temperature converter filter is photographed and the ratios R/G and B/G are calculated. The ratios correspond to a point C (a3, b3) in FIG. 25. These data are stored in a memory section (not shown) in the microcomputer 129. In accordance with the stored data, the judging portion 135 approximates a color temperature detecting axis 149 as shown a A-B-C line in FIG. 25.

Figure 25:
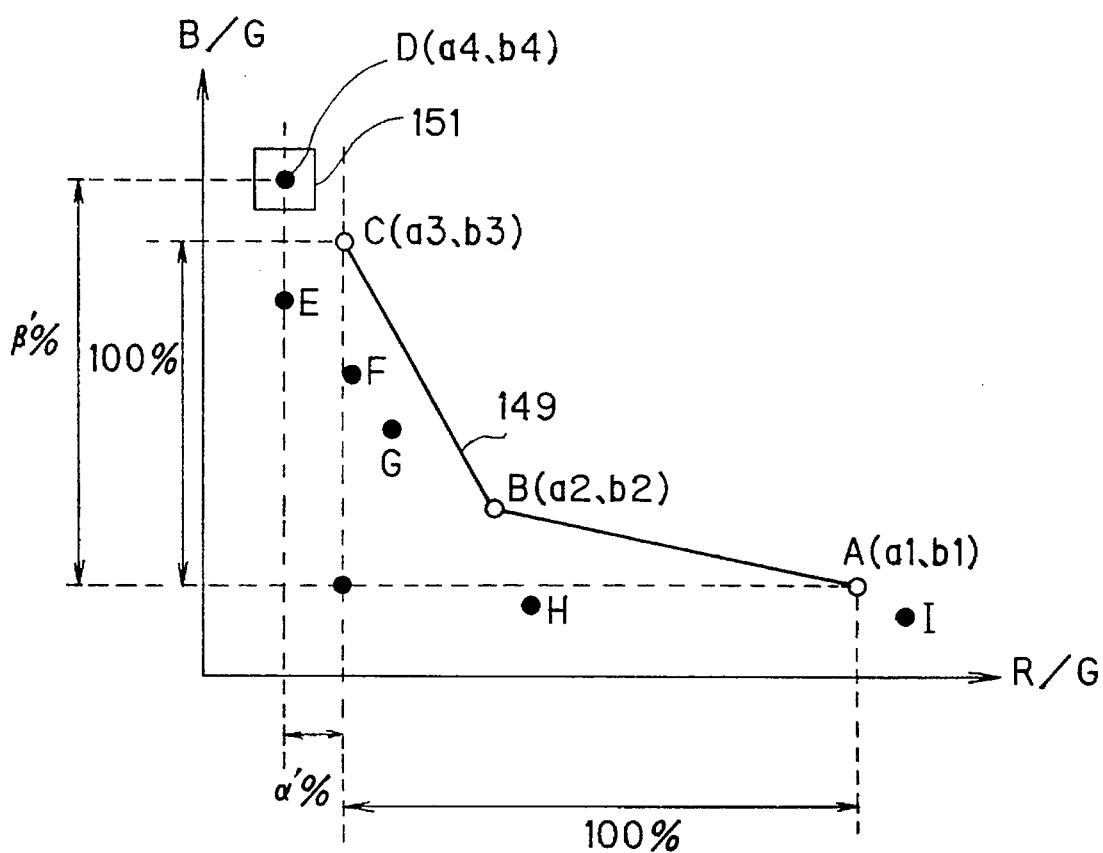
FIG. 25 shows a color temperature detecting region with respect to a fluorescent lamp in the fourth embodiment.

Further, in accordance with the color temperature detecting axis 149 and the gaps α' and β' (%) memorized in the memory portion 139B, color temperature detecting points D, E, F, G and I corresponding to each reference illuminating lights are determined in the video camera. In FIG. 25, points D, E, F, G, H and I indicate a three wavelength daylight fluorescent lamp, a daylight fluorescent lamp, a three wavelength day white fluorescent lamp, a day white fluorescent lamp, a white fluorescent lamp and a halide lamp, respectively. The judging portion 135 judges whether the ratios R/G and B/G detected from the computer portion 133 are corresponding to one of the color temperature detecting points D, E, F, G and I. Thus, the kind of the illuminating light can be detected. Then the corresponding ratios R/G and B/G are output to the computing portion 137.

In FIG. 25, the point D is calculated along the following equation based on the color temperature change axis approximated by reference illuminating lights.

$$\alpha'=100\ (a4-a3)\ /\ (a1-a3)$$

$$\beta'=100\ (b4-b1)\ /\ (b3-b1)$$

$$a4=a3+(a1-a3)\times(\alpha'/100)$$

$$b4=b3+(b3-b1)\times(\beta'/100)$$

In the above example, a color temperature detecting region is not limited the region as shown in FIG. 25. It is possible to provide an acceptable width 51 with considering the gaps. However, an acceptable width of one detecting point is not overlapped with that of adjacent detecting point. On the other hand, a detecting point may not have a width at an initial stage. Unless a kind of illuminating light can be detected, the detecting point may have a width. If the gaps α' and β' are determined once for one type of video cameras, the gaps may be memorized as the constant numbers in a software for the microcomputer 129 or memorized proper numbers in an electrical erasable programable read only memory (EEPROM). If the gaps can be changeable, video cameras can be controlled white balance individually.

As described above, the differences between the highest values and the lowest values of the ratios R/G and B/G are recognized as 100% for each points A, B and C. The gaps (%) with respect to a fluorescent lamp and the other lamps are predetermined, respectively. Even if each complementary color filters of a charge coupled device have an individual dispersion, the gaps (%) is constant. The dispersion caused by a charge coupled device and the other device can be reduced by adjusting the gaps so that a feed forward type white balance can be controlled properly.

Figure 26:
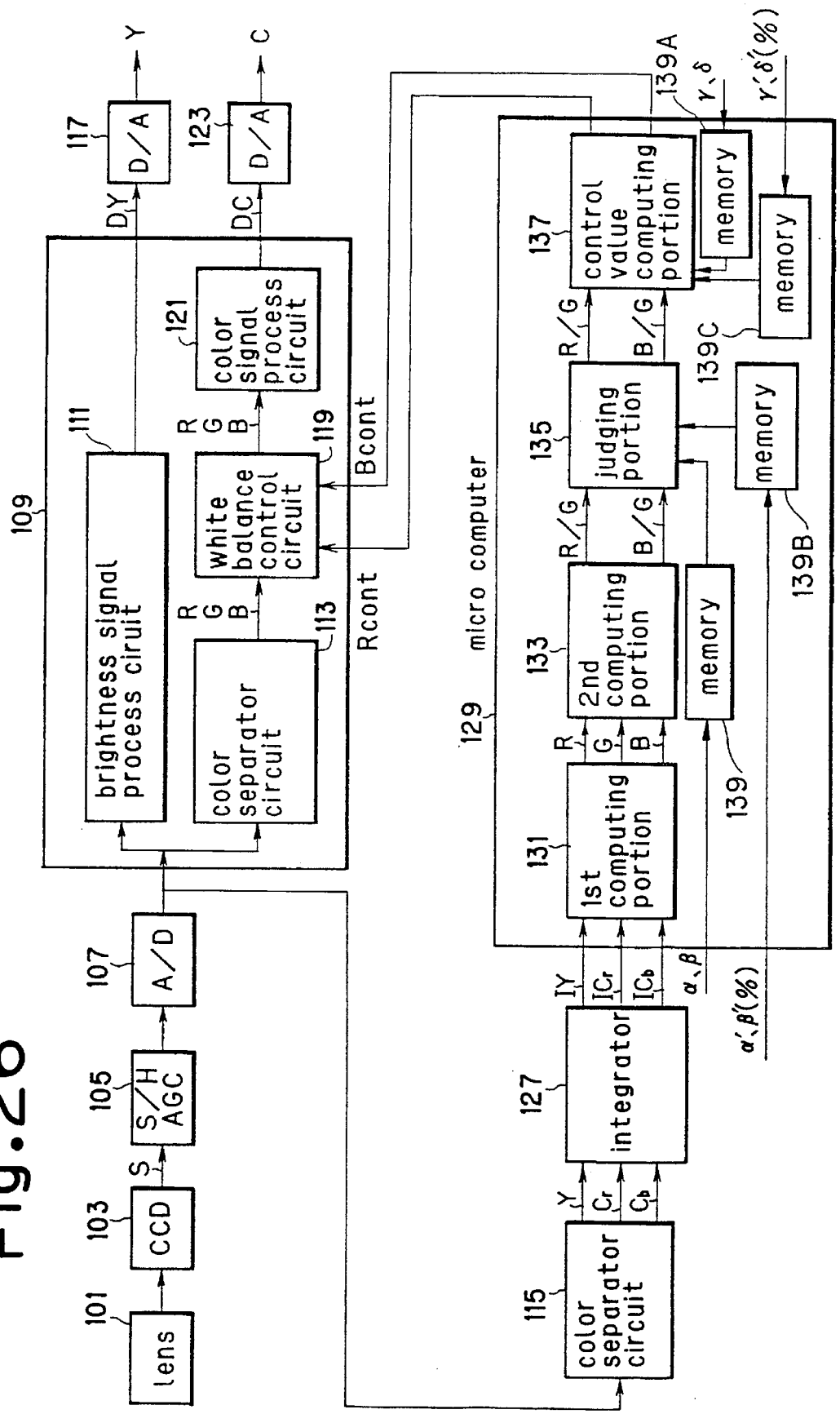
FIG. 26 shows a circuit of photographing system utilized for the fifth embodiment of a video camera according to the present invention.

The fifth embodiment according to the present invention is shown in FIG. 26 through FIG. 29. FIG. 26 shows a circuit of a photograph system of the fifth embodiment of the video camera of the present invention. Upon comparing with the fourth embodiment as shown in FIG. 22 and the fifth embodiment, a memory section 139C is added to the microcomputer 129 and a new performance is added to the microcomputer 137 in the fifth embodiment. The other equipments in the fifth embodiment are the same to the corresponding equipments in the fourth embodiment.

The microcomputer 129 stored the gap γ' (%) for the control signal Rcont and the gap δ' (%) for the control signal Bcont with respect to the color temperature control region in addition to a basic operation as shown in FIG. 14. In accordance with the gaps γ' and δ' (%), the computing portion 137 computes a color temperature control region by utilizing the gaps γ' and δ' and outputs the control signals Rcont and Bcont to a white balance circuit 119.

Figure 27:
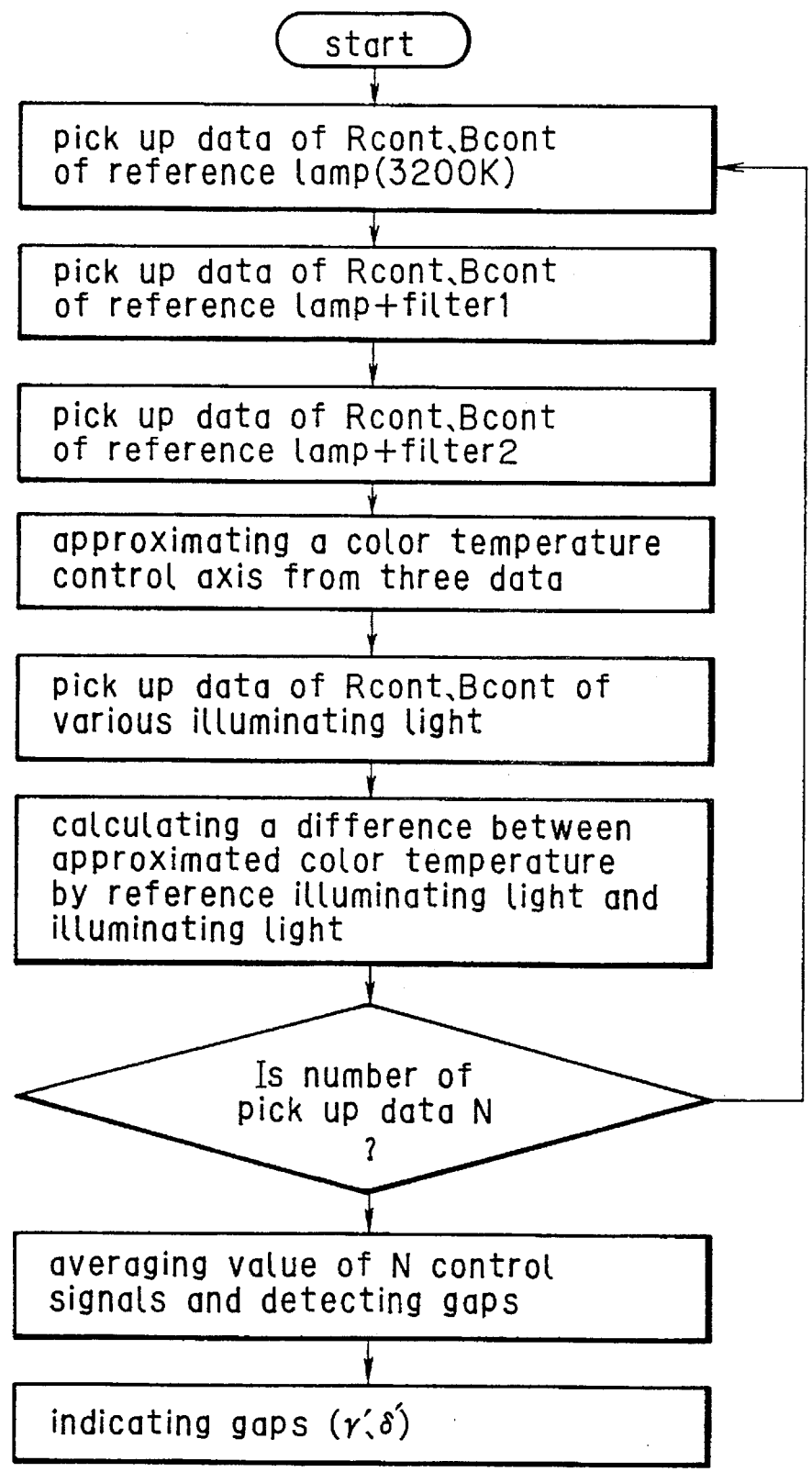
FIG. 27 shows a flow chart for determining a gap between an approximate color temperature line and an actual fluorescent lamp value in the fifth embodiment.

The acceptable gaps γ' and δ' are determined in accordance with experimental data of a lot of video cameras. FIG. 27 shows a flow chart how acceptable gaps γ' and δ' are determined with respect to various fluorescent lamps. For example, a reference lamp having a color temperature of 3200K is photographed by a video camera in order to obtain the data of the control signals Rcont and Bcont. In the next, a first color temperature converter filter for color temperature 4000K is attached to the reference lamp and the reference lamp with the first color temperature converter filter is photographed by the video camera in order to obtain the data of the control signals Rcont and Bcont. A second color temperature converter filter for color temperature 7500K is attached to the reference lamp and the reference lamp with the second color temperature converter filter is photographed by the video camera in order to obtain the data of the control signals Rcont and Bcont. By gathering three kind of data, a color temperature control axis 153 with respect to a fluorescent lamp can be approximated as shown line A-B-C in FIG. 29. Then, it is photographed under fluorescent light in order to obtain the data of various control signals Rcont and Bcont. Comparing with the both data, gaps γ' and δ' between the approximate color temperature of the reference light and the color temperature of various actual fluorescent light are calculated, respectively. Such a data pick-up operation is repeated for some (N) video cameras. Average gaps γ' and δ' are determined by the data sampled from N video cameras. These average gaps γ' and δ' are corresponding to the differences between the highest value and the lowest value of the control signals Rcont and Bcont of the color temperature control axis and determined as 100%.

The determined gaps γ' and δ'(%) are stored into a memory portion 139C of each video camera in a producting operation.

Figure 28:
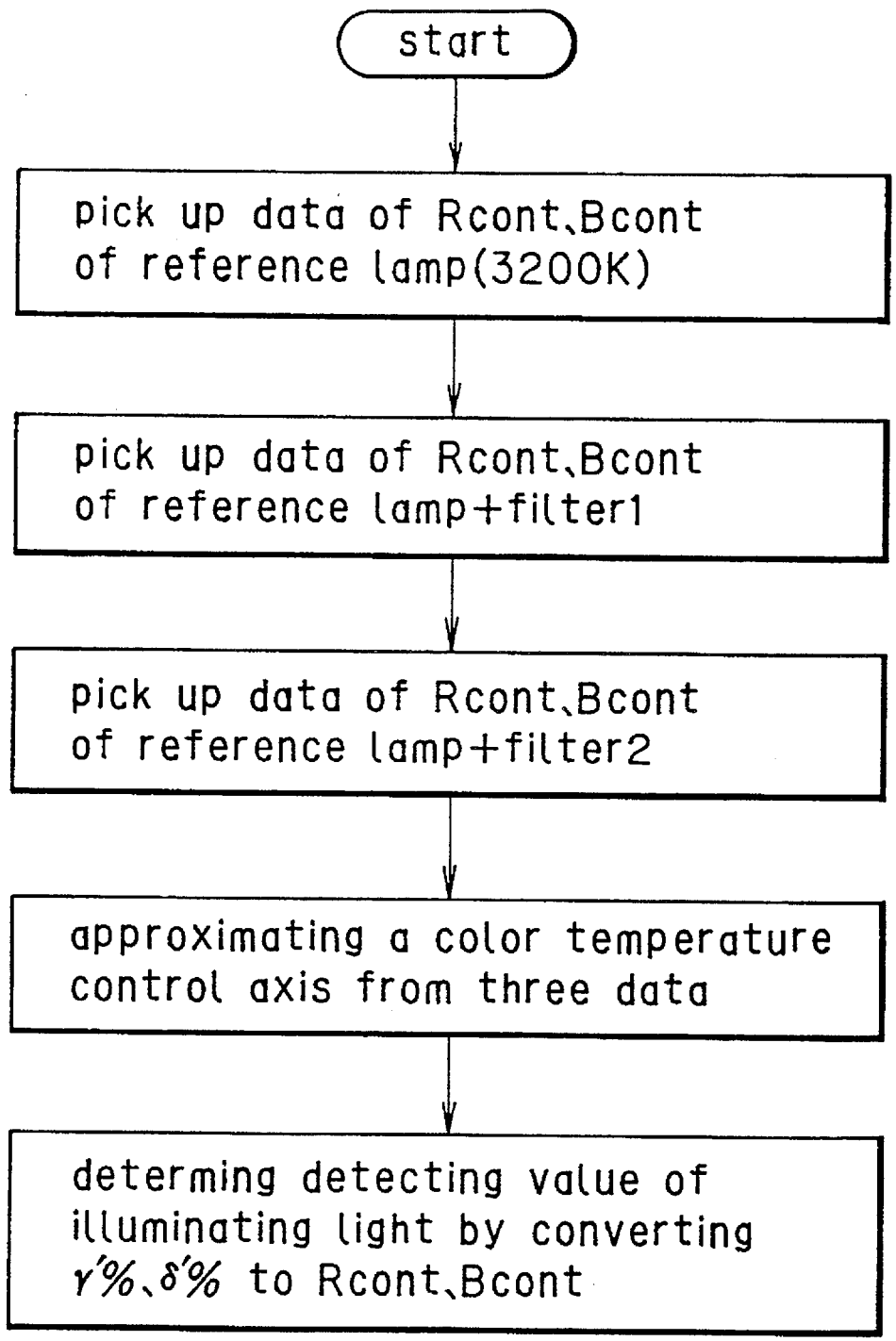
FIG. 28 shows a flow chart for determining a color temperature detecting region with respect to a fluorescent lamp in the fifth embodiment.
Figure 29:
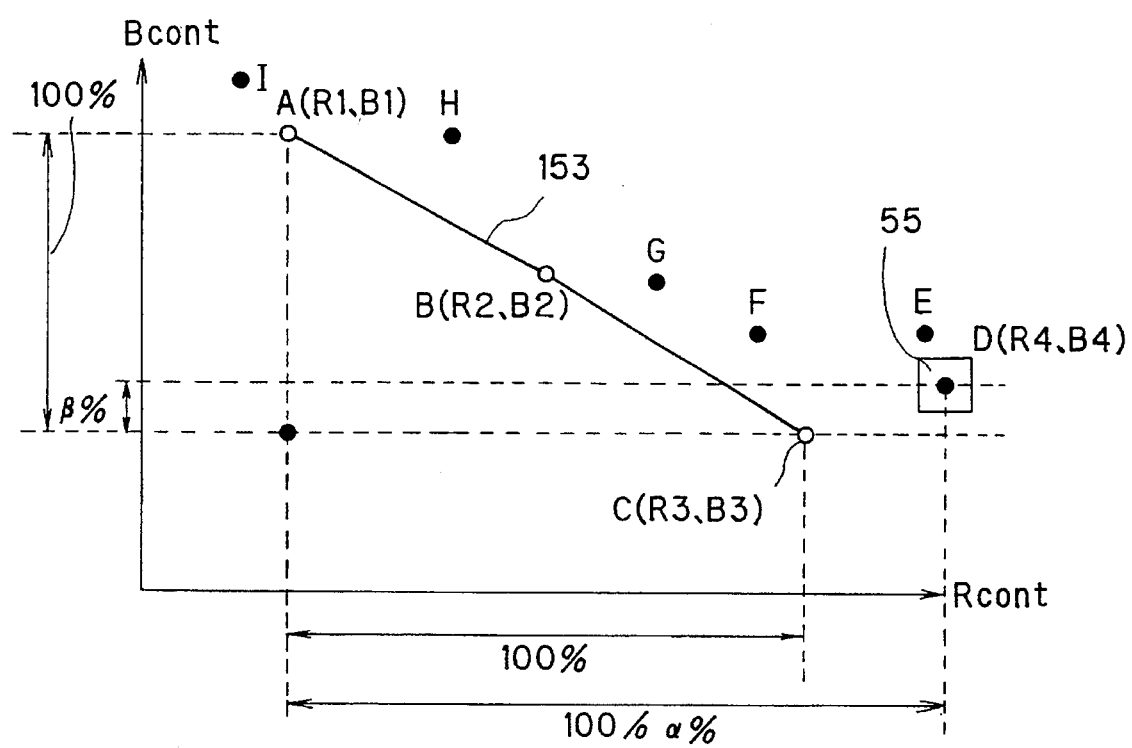
FIG. 29 shows a color temperature detecting region with respect to a fluorescent lamp in the fifth embodiment.

FIG. 28 shows a flow chart of an operation for controlling white balance of each video camera in a product operation. Firstly, a reference illuminating lamp having a color temperature of 3200K is photographed and the values of the control signals Rcont and Bcont are calculated. The values correspond to a point A (R1, B1) in FIG. 29. The first color temperature converter filter is attached to the reference illuminating lamp. The illuminating light is photographed through the first color temperature converter filter and the values of the control signals Rcont and Bcont are calculated. The values correspond to a point B (R2, B2) in FIG. 29. Then, the second color temperature converter filter is attached to the reference illuminating lamp. It is photographed the illuminating light through the second color temperature converter filter and the values of the control signals Rcont and Bcont are calculated. The values correspond to a point C (R3, B3) in FIG. 29. These data are stored in a memory section (not shown) in the microcomputer 129. In accordance with the stored data, the computing portion 137 approximates a color temperature control axis 145 as shown in a A-B-C line in FIG. 29. Further, color temperature control points D, E, F, G, and I of a video camera correspond to various light of illuminating lamps are determined by sliding he color temperature control axis 153 in accordance with respective gaps (γ', δ') memorized in the memory 139C. The computing portion 137 outputs control values Rcont and Bcont corresponding to judged illuminating light to a white balance control circuit 119 based on ratios R/G and B/G. In FIG. 29, points D, E, F, G, H and I indicate a three wavelength daylight fluorescent lamp, a daylight fluorescent lamp, a three wavelength day white fluorescent lamp, a day white fluorescent lamp, a white fluorescent lamp and a halide lamp, respectively.

In FIG. 29, the point D is calculated along the following equation based on the color temperature change axis approximated by reference illuminating lights.

$$\gamma'=100\ (R4-R1)\ /\ (R3-R1)$$

$$\delta'=100\ (B4-B3)\ /\ (B1-B3)$$

$$R4=R1+(R3-R1)\times(\gamma'/100)$$

$$B4=B3+(B1-B3)\times(\delta'/100)$$

In the above example, a color temperature detecting region is not limited the region as shown in FIG. 29. It is possible to adjust control values Rcont and Bcont by providing an acceptable width 55 with considering he gaps. If the gaps γ' and δ' are determined once for one type of video cameras, the gaps may be stored as the constant numbers in a software for the microcomputer 129 or memorized proper numbers in an electrical erasable programable read only memory (EEPROM). If the gaps can be changeable, video cameras can be controlled white balance individually.

As described above, the differences between the highest values and the lowest values of the ratios R/G and B/G are recognized as 100% for each points A, B and C. Thus, the gaps (%) with respect to a fluorescent lamp and so on is predetermined. Even if each complementary color filter of a charge coupled device has an individual dispersion, the gaps (%) is constant. The dispersion caused by a charge coupled device and so on can be reduced by adjusting the gaps so that a feed forward type white balance can be controlled properly.

As described above, in the second through the fifth embodiments, white balance can be controlled properly by adjusting the characteristic dispersion caused by charge coupled devices, gaps of color temperature between reference light and measured sunshine and fluorescent lamps.

The sixth embodiments according to the present invention will be described with referred to FIG. 30 through FIG. 32.

Figure 30:
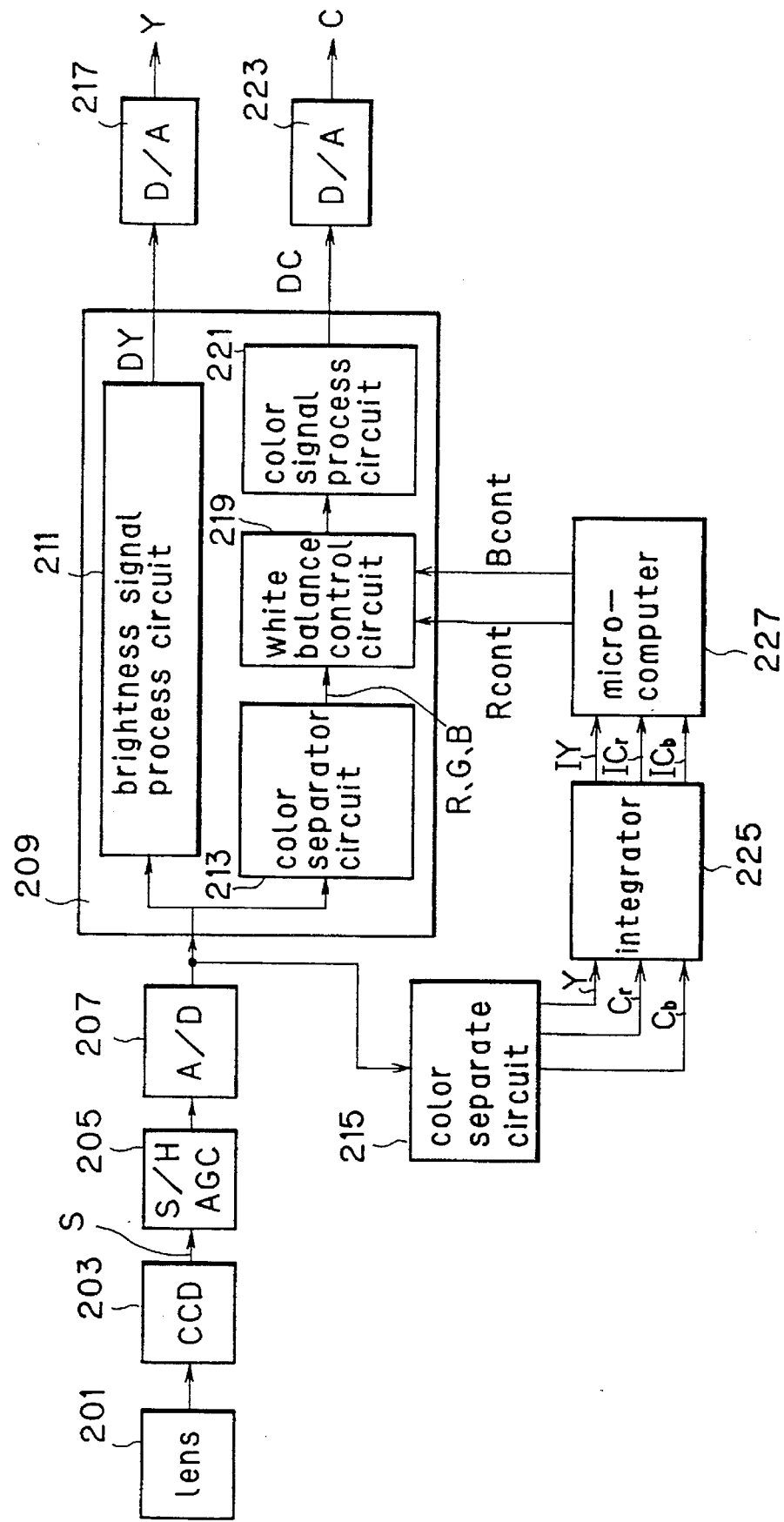
FIG. 30 shows a circuit of photographing system utilized for the sixth embodiment of a video camera with an automatic white balance control device according to the present invention.
Figure 31:
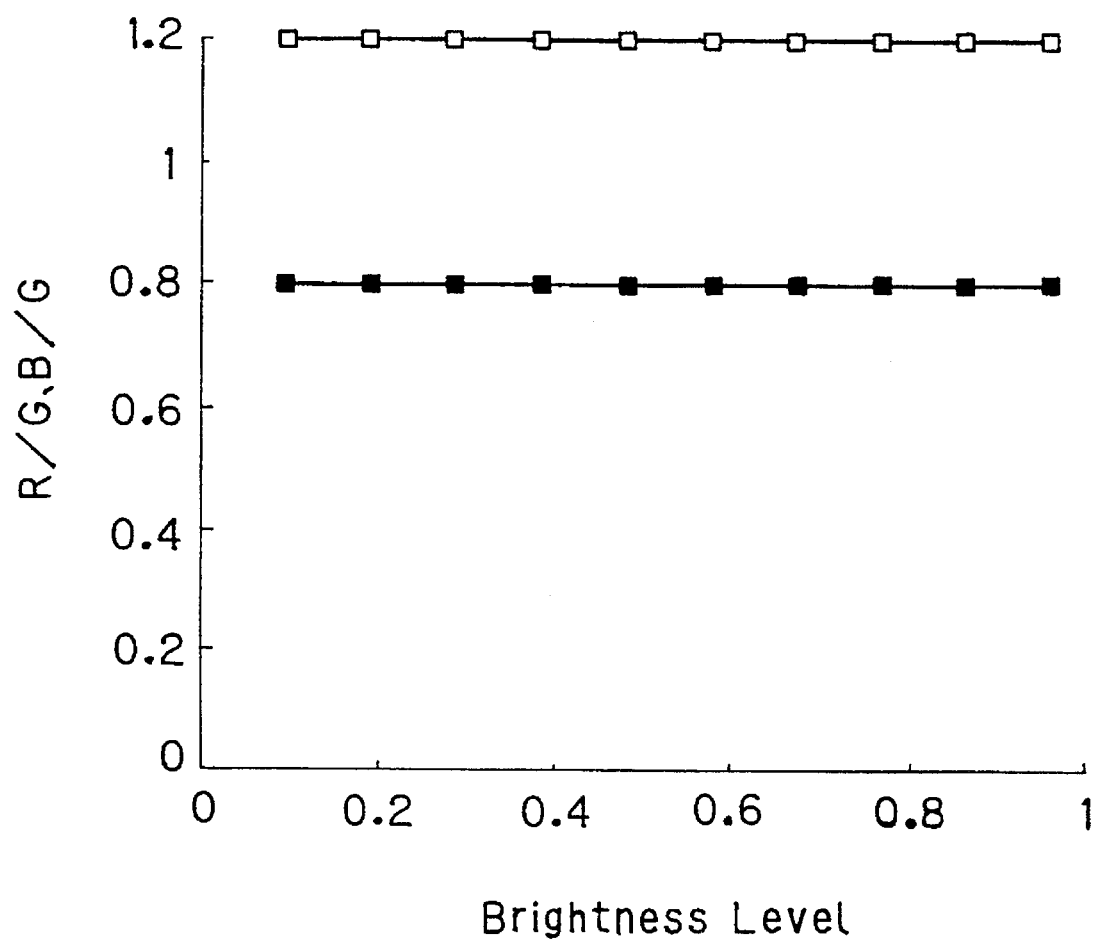
FIG. 31 shows a characteristic of a relation between R/B ratio and B/G ratio and a brightness level in the sixth embodiment.

FIG. 30 shows a block diagram of one of the embodiments equipped to a photograph system of a video camera according to the present invention. As shown in FIG. 30, an optical image is formed on a light receiving surface of a charge coupled device 203 through a lens 201. A photograph signal S is output from the charge coupled device 203. The photograph signal S is sample/hold processed and gain controlled in a sample/hold and automatic gain control circuit 205. The photograph signal 5 is converted to a digital signal by an analog/digital converter 207. The converted signal is input to a color separator circuit 215 through a brightness signal process circuit 211 and a color separater 213 in a signal process circuit 208.

The brightness signal process circuit 211 outputs a digital brightness signal DY by processing the signal S. The digital brightness signal DY is converted to an analog brightness signal Y by the digital/analog converter 217. The color separater circuit 213 outputs three elementary color signals R, G and B. The three elementary color signals R, G and B are white balance controlled (gain controlled) in accordance with the values of white balance control signals Rcont and Bcont in the white balance circuit 219. The controlled elementary signals R, G and B are converted to a digital color signal DC in the color signal process circuit 221. The digital color signal DC is converted to an analog color signal C and output in a digital/analog converter 223.

The color separater circuit is connected to an integrator 225 and a microcomputer 227. In the integrator 225, the brightness signal Y and color combination signals Cr and Cb are integrated and the integrated values IY, and ICb are output for every one field.

In the microcomputer 227, a green integrated value IG, a red integrated value IR and a blue integrated value IB are matrix processed from the integrated values IY, ICr and ICb. A ratio IR/IG (a ratio of the integrated value IR with respect to the integrated value IG) and a ratio IB/IG (a ratio of the integrated value IB with respect to the integrated value IG) are detected. White balance control signals Rcont and Bcont for controlling white balance properly are computed based on the ratios IR/IG and IB/IG. Thus, optimum white balance can be controlled by utilizing the white balance control signals Rcont and Bcont in the white balance circuit 219.

In the above case, the ratios IR/IG and IB/IG are not changed little although the brightness level is changed. FIG. 31 shows a relation between ratio R/G and B/G of the elementary signals R, G and B and brightness level. The relation as shown in FIG. 31 can correspond to the relation between integrated ratios IR/IG and IB/IG and brightness level. If an iris open degree is rapidly increased from zero to a proper exposure level (a horizontal dot line as shown in FIG. 32) at high speed, the brightness is rapidly changed. However, the values of the white balance control signals Rcont and Bcont can be detected by detecting white balance control signals Rcont and Bcont based on the integrated ratios IR/IG and IB/IG.

In a video camera system as shown in FIG. 30, while a power save mechaanism is actuated, a predetermined time (for example, 0.5 sec.) is designed as one field period for computing white balance control signals Rcont and Bcont from the integrated ratios IR/IB, IG/IB (see FIG. 3). The above process is computed at high speed. Even if the open degree of an iris is changed rapidly, certain values of white balance control signals Rcont and Bcont can be computed, since the signals Rcont and Bcont are calculated based on the ratios IR/IB and IG/IB which are not influenced with brightness changing. The values of the white balance control signals Rcont and Bcont are converged to proper values, respectively.

In the above described predetermined time, white balance control signals Rcont and Bcont may be detected for every several fields. When white balance control singals Rcont and Bcont are computed in every one field, the values of the white balance signals Rcont and Bcont may be renewed only in the condition that the values become constant for at least several fields. Further, as shown in FIG. 32, values of white balance control signals Rcont and Bcont may be begun to compute at high speed (in every one field or every several field) after a period 1. In the period 1, an open degree of an iris is increased to a predetermined level, that is, a brightness level is approached to a predetermined level. In the case that a brightness level is very low, there are high possibility that noise components are included to a detecting signal. Therefore, it had better not computing in the period when a brightness level is very low.

After passing over the predetermined time, the open degree of the iris becomes stale and approached to a proper level so that the microcomputer 227 computes and outputs white balance control signals Rcont, Bcont and the white balance control circuit begins to control white balance. For the predetermined time, the values of the control signals Rcont and Bcont are converged. The first output values of the control signals Rcont and Bcont become optimim values. In this condition, a period for computing and outputting the values of the control signals Rcont and Bcont is once for 20~30 fields (normal white balance control period). The reason why the period becomes long is that a color temperature would not be so changed while photographing at the same location and it is not wished to chage color rapidly. Therefore, slow control is sufficienet in the condition.

In the seventh embodiment of the present invention, while a photograph button is pushed in a power save operation, values of white balance control signals Rcont and Bcont are computed for every one field or every several fields in a period from pushing the photograph button to beginning to record. As shown in FIG. 32, the values of the white balance control signals are computed at high sped in the period I-1 from a moment when an open degree of an iris becomes a predetermined level to a moment when recording is begun actually.

After actually recording, the microcomputer 227 computes and outputs the values of white balance control signals Rcont and Bcont for every 20~30 fields and the white balance circuit 219 control white balance.

The moment when the recording is actually begun may be determined by a predetermined time after pushing a photograph button or a condition that the iris becomes stable and its conditon is detected. Furthre, the recording may be started from a moment when an open degree of an iris becomes stable and phase synchronize of a rotational drum is finished.

As described above, according to the sixth and seventh embodiments of the present invention, even if an open degree of an iris is rapidly changed from zero after pushing a photograph button and a brightness level is charged remarkably, certain white balance control signal can be obtained. Thereby, when the recording is actually started, values of the white balance control signals become stable and white balance is controlled properly in order to record.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An automatic white balance control device comprising:

picture dividing means, receiving a photograph signal corresponding to a photograph condition, for dividing a picture image into a plurality of areas and periodically receiving picture signals with respect to one of the plurality of areas for one field in numerical order;

integrating means for integrating picture signals output from said picture dividing means and outputting integrated values for every one field;

control means for judging whether an average color of said picture signals within each of said areas outputting said picture signals is substantially white, outputting white balance control signals in accordance with said integrated values when said average color is judged as substantially white and outputting to said picture dividing means a command representing a number of divided areas for which said picture image is to be divided and a white balance circuit for controlling white balance by adjusting levels of elementary color signals in accordance with said white balance control signals, wherein said control means groups said divided areas into a plurality of groups according to predetermined patterns corresponding to each different group, adjacent divided areas are grouped into different groups from each other, signals are alternatively output from each of said groups in accordance with said command.

2. An automatic white balance control device comprising:

picture dividing means, receiving a photograph signal corresponding to a photograph condition, for dividing a picture image into a plurality of areas and picture signals with respect to each one of the plurality-of areas output periodically for one field in numerical order in a picture division mode and for outputting picture signals with respect to a whole picture image output for one field in a whole picture mode;

integrating means for integrating picture signals output from said picture dividing means and outputting integrated values for every one field;

control means, receiving said integrated values output from said integrating means, for judging whether an average color of said integrated values of an area of a picture image outputting picture signals is substantially white and outputting white balance control signals corresponding to said integrated values when said area is judged as substantially white; and a white balance control circuit for controlling white balance by adjusting levels of elementary color signals corresponding to said white balance control signals, wherein said control means outputs commands to said picture dividing means to start photographing in said whole picture mode and to switch said whole picture mode to said picture division mode when an average color of a picture image is judged as substantially white, and to switch said picture division mode to said whole picture mode when a ratio of areas judged as substantially white is less than a predetermined ratio.

3. An automatic white balance device as claimed in claim 2, wherein said control means groups said plurality of divided areas into a plurality of groups according to predetermined patterns corresponding to each different group at the moment said control means switches to said picture division mode, adjacent divided areas are grouped into different groups from each other and signals are alternatively output from each of said groups in accordance with said commands.

4. A video camera comprising:

a photographing lens;

an optical view finder;

a photograph button; and an automatic white balance control mechanism, said automatic white balance control mechanism comprising picture dividing means, receiving a photograph signal corresponding to a photograph condition, for dividing a picture image into a plurality of areas and picture signals with respect to each one of the plurality of areas output periodically for one field in numerical order in a picture division mode and for outputting picture signals with respect to a whole picture image output for one field in a whole picture mode, integrating means for integrating picture signals output from said picture dividing means and outputting integrated values for every one field, control means for inputting integrated values output from said integrating means, judging whether an average color of said integrated values of an area of a picture image is white from said integrated values, and outputting white balance control signals corresponding to said integrated values when said area is judged to be substantially white, and a white balance control circuit for controlling white balance by adjusting levels of elementary color signals corresponding to said white balance control signals, wherein said control means selects said whole picture mode for a predetermined time after pushing said photograph button and said picture division mode after said predetermined time has passed.

5. A video camera with an automatic white balance control mechanism as claimed in claim 4, wherein said predetermined time is fixed.

6. A video camera with an automatic white balance control mechanism as claimed in claim 4, wherein said predetermined time represents a period of time from pushing said photograph button to actually recording.

7. A video camera with an automatic white balance control mechanism as claimed in claim 6, wherein said recording starts when an iris becomes stable.

8. A video camera comprising:

a photographing lens;

an optical view finder;

a photographic button; and an automatic white balance control mechanism, said automatic white balance control mechanism comprising picture dividing means, receiving a photograph signal corresponding to a photograph condition, for dividing a picture image into a plurality of areas and periodically receiving picture signals with respect to one of the plurality of areas for one field in order, integrating means for integrating said picture signals output from said picture dividing means and outputting integrated values for every one field, control means for judging whether an average color of of said integrated values of an area of a picture signal is substantially white, and for outputting white balance control signals in accordance with said integrated values when said average color is judged to be substantially white, and a white balance circuit for controlling white balance by adjusting levels of elementary color signals in accordance with said white balance control signals, wherein said control means generates and sends commands to said picture dividing means signifying the number of areas into which said picture image is to be divided, when the number of areas into which said picture image is to be divided is less during a predetermined time after pushing said photographed button than after said predetermined time has passed.

9. A video camera with an automatic white balance control mechanism as claimed in claim 8, wherein said predetermined time is fixed.

10. A video camera with an automatic white balance control mechanism as claimed in claim 8, wherein said predetermined time represents a period of time from pushing said photograph button to actually recording.

11. A video camera with an automatic white balance control mechanism as claimed in claim 10, wherein said recording starts when an iris becomes stable.

12. A method for controlling the automatic white balance of a photograph signal comprising the steps of:

dividing a picture image into a plurality of areas;

periodically receiving picture signals with respect to one of the plurality of areas for one field in numerical order;

integrating picture signals output from said picture dividing step;

outputting integrated values for every one field;

judging whether an average color of said picture signals within each of said areas outputting said picture signals is substantially white;

outputting white balance control signals in accordance with said integrated values when said average color is judged as substantially white;

outputting a command representing a number of areas for which said picture image is to be divided;

grouping said divided areas into a plurality of groups according to predetermined patterns corresponding to each different group, adjacent divided areas being grouped into different groups from each other;

alternatively outputting white balance control signals from each of said groups in accordance with said command; and controlling white balance by adjusting levels of elementary color signals in accordance with said white balance control signals from said alternatively outputting step.

13. A method for automatically controlling white balance of a photograph signal comprising the steps of:

dividing a picture image into a plurality of areas and out putting picture signals with respect to each one of the plurality of areas periodically for one field in numerical order in a picture division mode;

outputting picture signals with respect to a whole picture image output for one field in a whole picture mode;

integrating picture signals output from said picture dividing step;

outputting integrated values for every one field;

judging whether an average color of an area of a picture image outputting picture signals is substantially white from said integrated values;

outputting commands to start photographing in said whole picture mode and to switch said whole picture mode to said picture division mode when an average color of a picture image is judged as substantially white, and to switch said picture division mode to said whole picture mode when a ratio of areas judged as substantially white is less than a predetermined ratio; and outputting white balance control signals corresponding to said integrated values when said area is judged as white.

14. A method as claimed in claim 13, further comprising grouping said plurality of divided areas into a plurality of groups according to predetermined patterns corresponding to each different group at the moment output commands switch to said picture division mode, adjacent areas are grouped to different groups from each other and signals are alternatively output from each of said groups in accordance with said commands.

* * * * *